(12) United States Patent
Huang et al.

(10) Patent No.: US 11,968,047 B2
(45) Date of Patent: Apr. 23, 2024

(54) METHOD AND APPARATUS FOR SENDING FEEDBACK INFORMATION, AND METHOD AND APPARATUS FOR RECEIVING FEEDBACK INFORMATION

(71) Applicant: HUAWEI TECHNOLOGIES CO., LTD., Guangdong (CN)

(72) Inventors: Huang Huang, Chengdu (CN); Kuandong Gao, Chengdu (CN); Peng Guan, Shenzhen (CN); Bo Fan, Chengdu (CN); Lei Chen, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 534 days.

(21) Appl. No.: 17/190,490

(22) Filed: Mar. 3, 2021

(65) Prior Publication Data

US 2021/0194636 A1    Jun. 24, 2021

Related U.S. Application Data

(63) Continuation of application No. PCT/CN2019/104287, filed on Sep. 4, 2019.

(30) Foreign Application Priority Data

Sep. 4, 2018    (CN) .......................... 201811024350.6

(51) Int. Cl.
*H04L 1/18*    (2023.01)
*H04L 1/1812*    (2023.01)
(Continued)

(52) U.S. Cl.
CPC ....... *H04L 1/1812* (2013.01); *H04W 72/0453* (2013.01)

(58) Field of Classification Search
None
See application file for complete search history.

(56) References Cited

U.S. PATENT DOCUMENTS 8,605,810 B2    12/2013  Papasakellariou et al.
2015/0009930 A1*  1/2015  Rapaport ............ H04W 72/542
                                                    370/329
(Continued)

FOREIGN PATENT DOCUMENTS

CN    101217301 A    7/2008
CN    101366304 A    2/2009
(Continued)

OTHER PUBLICATIONS

Intel Corporation,"Multiplexing of multiple HARQ-ACK feedback", 3GPP TSG RAN WG1 Meeting #88b R1-1704779, Spokane, USA, Apr. 3-7, 2017, total 3 pages.
(Continued)

*Primary Examiner* — Hong Shao

(57) ABSTRACT

This application provides a method and an apparatus for sending feedback information and a method and an apparatus for receiving feedback information, to reduce resource waste in a data retransmission process. The method includes: A terminal device receives association relationship indication information from a network device, where the association relationship indication information is used to indicate a plurality of transmission units having an association relationship or a plurality of hybrid automatic repeat request (HARQ) processes having an association relationship; the terminal device receives, from the network device based on the association relationship indication information, data of the plurality of transmission units or the plurality of HARQ processes having an association relationship; the terminal device successfully receives one of the plurality of transmission units or data of one of the plurality of HARQ (Continued)

processes; and the terminal device sends a positive acknowledgement to the network device.

20 Claims, 10 Drawing Sheets

(51) Int. Cl.
*H04W 72/04* (2023.01)
*H04W 72/0453* (2023.01)

(56) References Cited

U.S. PATENT DOCUMENTS

| | | | | |
|---|---|---|---|---|
| 2018/0014298 | A1* | 1/2018 | Sun | H04W 72/21 |
| 2020/0280397 | A1* | 9/2020 | Gao | H04L 5/0055 |

FOREIGN PATENT DOCUMENTS

| | | | |
|---|---|---|---|
| CN | 103378953 | A | 10/2013 |
| CN | 103873185 | A | 6/2014 |
| CN | 103973413 | A | 8/2014 |
| CN | 104539343 | A | 4/2015 |
| CN | 106130701 | A | 11/2016 |
| CN | 106900059 | A | 6/2017 |
| CN | 107820685 | A | 3/2018 |
| CN | 107896121 | A | 4/2018 |
| EP | 2296304 | A2 | 3/2011 |
| WO | 2015191530 | A2 | 12/2015 |
| WO | 2018082059 | A1 | 5/2018 |
| WO | 2018141246 | A1 | 8/2018 |

OTHER PUBLICATIONS

3GPP TS 36.211 V12.4.0 (Dec. 2014), 3rd Generation Partnership Project;Technical Specification Group Radio Access Network;Evolved Universal Terrestrial Radio Access (E-UTRA); Physical channels and modulation (Release 12), total 124 pages.

Huawei et al., "Multiplexing of multiple HARQ-ACK feedback", 3GPP TSG RAN WG1 Meeting #89 R1-1708151, Hangzhou, China, May 15-19, 2017, total 3 pages.

3GPP TS 36.212 V13.0.0 (Dec. 2015),3rd Generation Partnership Project;Technical Specification Group Radio Access Network; Evolved Universal Terrestrial Radio Access (E-UTRA); Multiplexing and channel coding (Release 13), total 121 pages.

3GPP TS 36.213 V13.0.0 (Dec. 2015), 3rd Generation Partnership Project;Technical Specification Group Radio Access Network;Evolved Universal Terrestrial Radio Access (E-UTRA); Physical layer procedures (Release 13), total 326 pages.

Qualcomm Incorporated,"Outer erasure code use cases and evaluation assumptions", 3GPP TSG-RAN WG1 #85 R1-164703, May 23-27, 2016, total 6 pages.

Search Report issued in CN 2018110243506 dated Jul. 17, 2020, total 4 pages.

Office Action issued in CN 201811024350.6 dated Jul. 28, 2020, total 6 pages.

International Search Report and Written Opinion issued in PCT/CN2019/104287, dated Nov. 27, 2019, total 9 pages.

European Search Report dated Jul. 10, 2021 for Application 19857480.8, 9 pages.

\* cited by examiner

METHOD AND APPARATUS FOR SENDING FEEDBACK INFORMATION, AND METHOD AND APPARATUS FOR RECEIVING FEEDBACK INFORMATION

CROSS-REFERENCE TO RELATED APPLICATIONS

This application is a continuation of International Application No. PCT/CN2019/104287, filed on Sep. 4, 2019, which claims priority to Chinese Patent Application No. 201811024350.6, filed on Sep. 4, 2018. The disclosures of the aforementioned applications are hereby incorporated by reference in their entireties.

TECHNICAL FIELD

This application relates to the field of wireless communications technologies, and in particular, to a method and an apparatus for sending feedback information, and a method and an apparatus for receiving feedback information.

BACKGROUND

Ultra reliable and low latency communication (URLLC) is an important application scenario in a next-generation communications system, and has relatively strict requirements on low latency and high reliability of data transmission. When data of a URLLC service is transmitted by using a high frequency technology, energy of a transmitted signal is limited in a beam direction by using a beamforming technology, so that the signal receiving efficiency can be improved. However, the beamforming technology also narrows the signal transmission range. Particularly, when a terminal device moves beyond coverage of antenna beams, communication between the terminal device and a network device is interrupted, and beam failure recovery needs to be performed. The beam failure recovery takes a relatively long time, which is about 100 ms. However, the URLLC service has a relatively high requirement on low latency, which is usually required to be less than 1 ms or even reach $10^{-5}$ ms. An excessively long time for the beam failure recovery cannot meet the requirement of the 1 ms low latency of URLLC.

To resolve this problem, the existing solution proposes that original data may be repeatedly transmitted. The repeatedly transmitted original data may be sent and received in different beam ranges or on different transmission reception points (TRPs) by using a plurality of hybrid automatic repeat request (HARQ) processes, so that the terminal device receives the data from different beam directions and TRPs, thereby improving the data transmission reliability.

However, if data in one of the plurality of HARQ processes is incorrectly received, the terminal device feeds back a negative acknowledgement (NACK) to a network side. After receiving the NACK fed back by the terminal device, the network side continues to retransmit the data by using the plurality of HARQ processes, resulting in relatively high resource waste.

SUMMARY

This application provides a method and an apparatus for sending feedback information and a method and an apparatus for receiving feedback information, that reduce resource waste in a data retransmission process.

According to a first aspect, this application provides a method for sending feedback information, where the method includes: A terminal device receives association relationship indication information from a network device, where the association relationship indication information is used to indicate a plurality of transmission units having an association relationship or a plurality of hybrid automatic repeat request HARQ processes having an association relationship; the terminal device receives, from the network device based on the association relationship indication information, data of the plurality of transmission units or the plurality of HARQ processes having an association relationship; the terminal device successfully receives one of the plurality of transmission units or data of one of the plurality of HARQ processes; and the terminal device sends a positive acknowledgement to the network device.

In the technical solutions of this application, the network device sends the association relationship indication information to the terminal device, to indicate, to the terminal device, the data of the plurality of transmission units having an association relationship or the plurality of HARQ processes having an association relationship. The terminal device sends the positive acknowledgement to the network device when successfully receiving one of the plurality of transmission units or successfully receiving the data of one of the HARQ processes. After receiving the positive acknowledgement from the terminal device, the network device may release HARQ processes corresponding to the plurality of transmission units having an association relationship or release the plurality of HARQ processes having an association relationship. The released HARQ processes can be used for transmission of new data or for other purposes, thereby reducing resource waste.

In this application, the plurality of transmission units having an association relationship carry same data, or carry a same part of data, or carry same or different redundancy versions of same data. The plurality of transmission units may be transmitted by using a plurality of different HARQ processes, or may be transmitted by using one HARQ process.

With reference to the first aspect, in some implementations of the first aspect, before the terminal device sends a positive acknowledgement to the network device, the method further includes: The terminal device receives transmission mode indication information from the network device, where the transmission mode indication information is used to indicate a transmission mode used by the network device to transmit the plurality of transmission units having an association relationship, and the transmission mode may include any one of the following: The plurality of transmission units are transmitted by using a plurality of different HARQ processes, and different transmission units carry same data, or the plurality of transmission units are transmitted by using a plurality of different HARQ processes, and different transmission units carry different redundancy versions of same data; or the plurality of transmission units are transmitted by using one HARQ process, and different transmission units carry same data; or the plurality of transmission units are transmitted by using a plurality of different HARQ processes, and the different transmission units carry a same part of data.

The network device sends the transmission mode indication information to the terminal device, to indicate, to the terminal device, the transmission mode used by the network device to transmit data. After receiving the transmission mode indication information, the terminal device may learn that the network device will enable the foregoing transmission modes provided in this application to transmit data. Correspondingly, after receiving the transmission mode indication information, the terminal device performs a "logical OR" operation on whether the data of the plurality of transmission units or the plurality of HARQ processes having an association relationship is successfully received, and sends a result of the "logical OR" operation to the network device. In other words, the terminal device sends the positive acknowledgement to the network device when one of the plurality of transmission units or the data of one of the plurality of HARQ processes is successfully received, where the positive acknowledgement is used to indicate that the terminal device successfully receives the data that is sent by the network device by using the plurality of transmission units or the plurality of HARQ processes. Therefore, the network releases all HARQ processes used to transmit the data, thereby reducing resource waste.

With reference to the first aspect, in some implementations of the first aspect, the method further includes: The terminal device receives priority information from the network device, where the priority information is used to indicate priorities of the plurality of transmission units having an association relationship or priorities of the plurality of HARQ processes having an association relationship. That the terminal device successfully receives one of the plurality of transmission units or the data of one of the plurality of HARQ processes includes: The terminal device successfully receives N transmission units with highest priorities in the plurality of transmission units or data of N HARQ processes with highest priorities in the plurality of HARQ processes; and that the terminal device sends a positive acknowledgement to the network device includes: The terminal device sends, in an HARQ process corresponding to each of the plurality of transmission units or in each of the plurality of HARQ processes, the positive acknowledgement to the network device, where N is an integer greater than or equal to 1. Alternatively, that the terminal device successfully receives one of the plurality of transmission units or the data of one of the plurality of HARQ processes includes: The terminal device successfully receives M transmission units with lowest priorities in the plurality of transmission units or data of M HARQ processes with lowest priorities in the plurality of HARQ processes; and that the terminal device sends a positive acknowledgement to the network device includes: The terminal device sends, in an HARQ process corresponding to each of the M transmission units or in each of the M HARQ processes, the positive acknowledgement to the network device, where M is an integer greater than or equal to 1. The method further includes: The terminal device sends, in HARQ processes corresponding to transmission units other than the M transmission units in the plurality of transmission units or in HARQ processes other than the M HARQ processes in the plurality of HARQ processes, a negative acknowledgement to the network device, where M is an integer greater than or equal to 1.

In this embodiment, the network device may configure priorities for the plurality of transmission units having an association relationship, and notify the terminal device of the priorities between the plurality of transmission units by using priority information. The terminal device preferentially receives N transmission units with highest priorities in the plurality of transmission units. If successfully receiving the N transmission units with highest priorities, the terminal device sends a positive acknowledgement to the network device in the HARQ process corresponding to each of the plurality of transmission units. Alternatively, when successfully receiving the M transmission units with lowest priorities in the plurality of transmission units, the terminal device sends a positive acknowledgement to the network device in the HARQ process corresponding to each of the M transmission units.

Optionally, the network device may also configure priorities for the plurality of HARQ processes having an association relationship. The terminal device preferentially receives the data of the N HARQ processes with highest priorities in the plurality of HARQ processes. If successfully receiving the data of the N HARQ processes with highest priorities, the terminal device sends a positive acknowledgement to the network device in each of the plurality of HARQ processes. Alternatively, when the terminal device successfully receives the M HARQ processes with lowest priorities in the plurality of HARQ processes, the terminal device sends a positive acknowledgement to the network device in each of the M HARQ processes.

The network device configures priorities for a plurality of transmission units or a plurality of HARQ processes having an association relationship, so that the terminal device can select to receive one or more transmission units or HARQ processes with highest priorities. When successfully receiving data of the one or more transmission units or HARQ processes with highest priorities, the terminal device directly sends a positive acknowledgement to the network device, and no longer receives other transmission units, thereby reducing power consumption of the terminal device.

With reference to the first aspect, in some implementations of the first aspect, that the terminal device sends a positive acknowledgement to the network device includes: The terminal device sends, in an HARQ process corresponding to at least one of the plurality of transmission units, the positive acknowledgement, where the at least one transmission unit includes any one of the plurality of transmission units, or the at least one transmission unit includes at least one of transmission units that are in the plurality of transmission units and that are successfully received by the terminal device; or the terminal device sends, in at least one of the plurality of HARQ processes, the positive acknowledgement, where the at least one HARQ process includes any one of the plurality of HARQ processes, or the at least one HARQ process includes at least one of HARQ processes that are in the plurality of HARQ processes and that are successfully received by the terminal device.

When the terminal device successfully receives one transmission unit or one HARQ process, the terminal device sends a positive acknowledgement to the network device. Specifically, the terminal device may send the positive acknowledgement to the network device in a plurality of manners. For example, one acknowledgement may be sent, or a plurality of acknowledgements may be sent. The terminal device may send one acknowledgement in an HARQ process corresponding to each of the plurality of transmission units having an association relationship, or send one acknowledgement to the network device only in an HARQ process corresponding to the successfully received transmission unit. When there are a plurality of successfully received transmission units, the positive acknowledgement may be sent in an HARQ process corresponding to each successfully received transmission unit, or the positive acknowledgement may be sent in an HARQ process corresponding to only one or some of the successfully received transmission units. When the terminal device successfully receives the one or more HARQ processes, manners of sending the positive acknowledgement are similar, and are not listed one by one.

With reference to the first aspect, in some implementations of the first aspect, the terminal device sends, in an HARQ process corresponding to at least one of transmission units that are in the plurality of transmission units and that are not successfully received by the terminal device, a positive acknowledgement and first link performance indication information to the network device, where the first link performance indication information is used to indicate link quality of the HARQ process corresponding to the at least one of the transmission units that are not successfully received by the terminal device; or the terminal device sends, in at least one of HARQ processes that are in the plurality of HARQ processes and that are not successfully received by the terminal device, a positive acknowledgement and second link performance indication information to the network device, where the second link performance indication information is used to indicate link quality of the at least one of the HARQ processes that are not successfully received by the terminal device.

When successfully receiving one transmission unit, the terminal device sends one or more acknowledgements to the network device. In this way, the network device learns that the terminal device successfully receives the data transmitted by using the plurality of transmission units or HARQ processes having an association relationship. However, in some cases, the network device does not know an actual status of link quality of these HARQ processes. For example, when successfully receiving one transmission unit, the terminal device sends one ACK to each of the plurality of transmission units having an association relationship. The network device does not know which transmission unit in the plurality of transmission units is successfully received. If the network device considers that link quality of HARQ processes corresponding to the plurality of transmission units is all good, a link status of an HARQ process corresponding to a transmission unit that is not successfully received may be incorrectly transmitted. Therefore, in this embodiment, the terminal device sends a positive acknowledgement to the network device, to indicate that the data is successfully received. Further, the terminal device sends link performance indication information to the network device, where the link performance indication information is used to indicate link quality of HARQ processes corresponding to one or more transmission units that are not successfully received by the terminal device. In this way, the network device adjusts a channel quality modulation and coding policy based on link quality of each link when performing next data transmission, thereby improving the data transmission efficiency.

With reference to the first aspect, in some implementations of the first aspect, the terminal device sends a negative acknowledgement in an HARQ process corresponding to at least one of transmission units that are in the plurality of transmission units and that are not successfully received by the terminal device; or the terminal device sends a negative acknowledgement in at least one of HARQ processes that are in the plurality of HARQ processes and that are not successfully received by the terminal device.

Optionally, in this embodiment of this application, when successfully receiving one transmission unit, in addition to sending a positive acknowledgement to the network device, the terminal device may send a negative acknowledgement to the network device in an HARQ process corresponding to each transmission unit that is not successfully received. The negative acknowledgement is used to indicate that the corresponding transmission unit is not successfully received. In this way, the network device can clearly know which transmission units in the plurality of transmission units having an association relationship are not successfully received, so that link statuses of HARQ processes corresponding to these transmission units can be learned, thereby improving the efficiency of the next data transmission.

It should be understood that when successfully receiving one HARQ process, the terminal device may alternatively send a negative acknowledgement to the network device in a similar method.

According to a second aspect, this application provides a method for receiving feedback information, where the method includes: A network device sends association relationship indication information to a terminal device, where the association relationship indication information is used to indicate a plurality of transmission units or a plurality of hybrid automatic repeat request HARQ processes having an association relationship; the network device sends data of the plurality of transmission units or the plurality of HARQ processes having an association relationship to the terminal device; and when one of the plurality of transmission units or data of one of the plurality of HARQ processes is successfully received by the terminal device, the network device receives a positive acknowledgement sent by the terminal device.

In the technical solutions of this application, the network device sends the association relationship indication information to the terminal device, to indicate, to the terminal device, the data of the plurality of transmission units having an association relationship or the plurality of HARQ processes having an association relationship. The terminal device sends a positive acknowledgement to the network device when successfully receiving one of the plurality of transmission units or successfully receiving the data of one of the plurality of HARQ processes. After receiving the positive acknowledgement from the terminal device, the network device may release HARQ processes corresponding to the plurality of transmission units having an association relationship or release the plurality of HARQ processes having an association relationship. The released HARQ processes can be used for transmission of new data or for other purposes, thereby reducing resource waste.

With reference to the second aspect, in some implementations of the second aspect, the method further includes: The network device sends transmission mode indication information to the terminal device, where the transmission mode indication information is used to indicate a transmission mode used by the network device to transmit the plurality of transmission units having an association relationship.

With reference to the second aspect, in some implementations of the second aspect, the method further includes: The network device sends priority information to the terminal device, where the priority information is used to indicate priorities of the plurality of transmission units having an association relationship or priorities of the plurality of HARQ processes having an association relationship. That the terminal device successfully receives one of the plurality of transmission units or the data of one of the plurality of HARQ processes includes: The terminal device successfully receives N transmission units with highest priorities in the plurality of transmission units or data of N HARQ processes with highest priorities in the plurality of HARQ processes; and that the network device receives a positive acknowledgement sent by the terminal device includes: The network device receives, in an HARQ process corresponding to each of the plurality of transmission units or in each of the plurality of HARQ processes, the positive acknowledgement sent by the terminal device, where N is an integer greater than or equal to 1. Alternatively, that the terminal device successfully receives one of the plurality of transmission units or the data of one of the plurality of HARQ processes includes: The terminal device successfully receives M transmission units with lowest priorities in the plurality of transmission units or data of M HARQ processes with lowest priorities in the plurality of HARQ processes; and that the network device sends a positive acknowledgement to the terminal device includes: The network device receives, in an HARQ process corresponding to each of the M transmission units or in each of the M HARQ processes, the positive acknowledgement sent by the terminal device, where M is an integer greater than or equal to 1. The method further includes: The network device receives, in HARQ processes corresponding to transmission units other than the M transmission units in the plurality of transmission units or in HARQ processes other than the M HARQ processes in the plurality of HARQ processes, a negative acknowledgement sent by the terminal device, where M is an integer greater than or equal to 1.

With reference to the second aspect, in some implementations of the second aspect, that the network device receives a positive acknowledgement sent by the terminal device includes: The network device receives, in an HARQ process corresponding to at least one of the plurality of transmission units, the positive acknowledgement sent by the terminal device, where the at least one transmission unit includes any one of the plurality of transmission units, or the at least one transmission unit includes at least one of transmission units that are in the plurality of transmission units and that are successfully received by the terminal device; or the network device receives, in at least one of the plurality of HARQ processes, the positive acknowledgement, where the at least one HARQ process includes any one of the plurality of HARQ processes, or the at least one HARQ process includes at least one of HARQ processes that are in the plurality of HARQ processes and that are successfully received by the terminal device.

With reference to the second aspect, in some implementations of the second aspect, the method further includes: The network device receives, in an HARQ process corresponding to at least one of transmission units that are in the plurality of transmission units and that are not successfully received by the terminal device, a positive acknowledgement and first link performance indication information that are sent by the terminal device, where the first link performance indication information is used to indicate link quality of the HARQ process corresponding to the at least one of the transmission units that are not successfully received by the terminal device; or the network device receives, in at least one of HARQ processes that are in the plurality of transmission units and that are not successfully received by the terminal device, a positive acknowledgement and second link performance indication information that are sent by the terminal device, where the second link performance indication information is used to indicate link quality of the at least one of the HARQ processes that are not successfully received by the terminal device.

With reference to the second aspect, in some implementations of the second aspect, the method further includes: The network device receives a negative acknowledgement in an HARQ process corresponding to at least one of transmission units that are in the plurality of transmission units and that are not successfully received by the terminal device; or the network device sends a negative acknowledgement in at least one of HARQ processes that are in the plurality of transmission units and that are not successfully received by the terminal device.

Optionally, in implementations of the first aspect or the second aspect, the plurality of transmission units are transmitted by using a plurality of different HARQ processes, and the plurality of different HARQ processes are transmitted by using different beams and/or transmission reception points TRPs. Alternatively, the plurality of transmission units are transmitted by using one HARQ process, and the HARQ process is transmitted by using different beams and/or different TRPs.

Optionally, in implementations of the first aspect or the second aspect, the transmission units include a transport block TB, a code block CB, a code block group CBG, or a codeword CW.

It should be understood that in this embodiment of this application, each of the plurality of transmission units having an association relationship may be a TB, a CB, a CBG, or a CW. In this way, the plurality of transmission units having an association relationship may all be of a same type. For example, the plurality of transmission units are all TBs. Alternatively, the plurality of transmission units may be combinations of different types. For example, one TB is associated with one or more CB Gs of another TB.

Optionally, in implementations of the first aspect or the second aspect, the plurality of transmission units are sent by using different frequency domain locations.

It should be understood that beneficial technical effects of the second aspect and the implementations of the second aspect are corresponding to those of the first aspect.

According to a third aspect, this application provides a communications apparatus. The communications apparatus has functions of implementing the terminal device in the first aspect or any possible implementation of the first aspect. These functions may be implemented by hardware, or may be implemented by hardware by executing corresponding software. The hardware or software includes one or more units corresponding to these functions.

According to a fourth aspect, this application provides a communications apparatus. The communications apparatus has functions of implementing the network device in the second aspect or any possible implementation of the second aspect. These functions may be implemented by hardware, or may be implemented by hardware by executing corresponding software. The hardware or software includes one or more units corresponding to these functions.

According to a fifth aspect, this application provides a terminal device, including a transceiver, a processor, and a memory. The processor is configured to control the transceiver to receive and send a signal, the memory is configured to store a computer program, and the processor is configured to invoke and run the computer program stored in the memory, so that the terminal device performs the method in the first aspect and any possible implementation of the first aspect.

According to a sixth aspect, this application provides a network device, including a transceiver, a processor, and a memory. The processor is configured to control the transceiver to receive and send a signal, the memory is configured to store a computer program, and the processor is configured to invoke and run the computer program stored in the memory, so that the network device performs the method in the second aspect and any possible implementation of the second aspect.

According to a seventh aspect, this application provides a computer-readable storage medium. The computer-readable storage medium stores an instruction. When the instruction is run on a computer, the computer is enabled to perform the method according to the first aspect or any possible implementation of the first aspect.

According to an eighth aspect, this application provides a computer-readable storage medium. The computer-readable storage medium stores an instruction. When the instruction is run on a computer, the computer is enabled to perform the method according to the second aspect or any possible implementation of the second aspect.

According to a ninth aspect, this application provides a chip, including a processor. The processor is configured to read and execute a computer program stored in a memory, to perform the method according to the first aspect or any possible implementation of the first aspect. Optionally, the chip includes a memory, and the memory and the processor are connected by using a circuit or a wire. Further, optionally, the chip further includes a communications interface, and the processor is connected to the communications interface. The communications interface is configured to receive data and/or information that needs to be processed. The processor obtains the data and/or information from the communications interface, processes the data and/or information, and outputs a processing result through the communications interface. The communications interface may be an input/output interface.

According to a tenth aspect, this application provides a chip, including a processor. The processor is configured to read and execute a computer program stored in a memory, to perform the method according to the second aspect or any possible implementations of the second aspect. Optionally, the chip includes a memory, and the memory and the processor are connected by using a circuit or a wire. Further, optionally, the chip further includes a communications interface, and the processor is connected to the communications interface. The communications interface is configured to receive data and/or information that needs to be processed. The processor obtains the data and/or information from the communications interface, processes the data and/or information, and outputs a processing result through the communications interface. The communications interface may be an input/output interface.

Optionally, the memory and the processor may be units physically independent of each other, or the memory may be integrated with the processor.

According to an eleventh aspect, this application provides a computer program product. The computer program product includes computer program code, and when the computer program code runs on a computer, the computer is caused to perform the method in the first aspect and any possible implementation of the first aspect.

According to a twelfth aspect, this application provides a computer program product. The computer program product includes computer program code, and when the computer program code runs on a computer, the computer is caused to perform the method in the second aspect and any possible implementation of the second aspect.

In the technical solutions of this application, the network device sends the association relationship indication information to the terminal device, to indicate, to the terminal device, the data of the plurality of transmission units having an association relationship or the plurality of HARQ processes having an association relationship. The terminal device sends the positive acknowledgement to the network device when successfully receiving one of the plurality of transmission units or successfully receiving the data of one of the plurality of HARQ processes. After receiving the positive acknowledgement from the terminal device, the network device may release HARQ processes corresponding to the plurality of transmission units having an association relationship or release the plurality of HARQ processes having an association relationship. The released HARQ processes can be used for transmission of new data or for other purposes, thereby reducing resource waste.

DESCRIPTION OF EMBODIMENTS

The following describes technical solutions of this application with reference to accompanying drawings.

Figure 1:
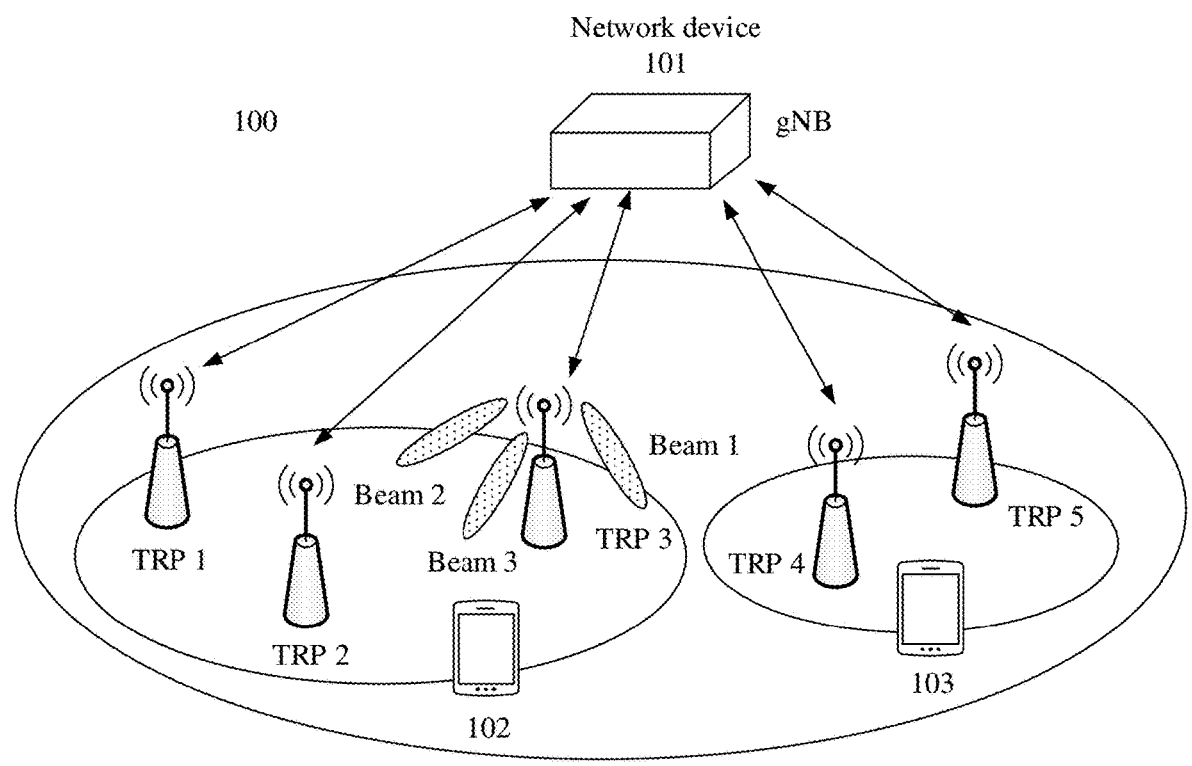
FIG. 1 is an architectural diagram of a wireless communications system applicable to this application.

FIG. 1 is an architectural diagram of a wireless communications system 100 applicable to this application. As shown in FIG. 1, a network device 101 may include a next-generation NodeB (gNB) or transmission reception points (TRPs). For example, to improve reliability of a terminal device, the gNB may provide a service for the terminal device by using one or more TRPs. Each TRP may perform air interface transmission with the terminal device by using one or more beams, and each beam may be an omnidirectional beam (that is, a 360-degree beam) or a directional beam. One or more TRPs may serve one terminal device at the same time. As shown in FIG. 1, the gNB performs wireless communication with the terminal device by using a plurality of TRPs. For example, the gNB performs wireless communication with a terminal device 102 by using a TRP 1, a TRP 2, and a TRP 3. In other words, the TRP 1, the TRP 2, and the TRP 3 serve the terminal device 102. The gNB performs wireless communication with a terminal device 103 by using a TRP 4 and a TRP 5. In other words, the TRP 4 and the TRP 5 serve the terminal device 103. It should be understood that communication between the TRP 3 shown in FIG. 1 and the terminal device 102 by using three beams (a beam 1, a beam 2, and a beam 3 shown in FIG. 1) is merely an example. Beams of other TRPs in FIG. 1 are not shown.

FIG. 1 is merely an example of an architecture of a communications system applicable to this application. The architecture shown in FIG. 1 may be considered as a two-layer architecture. To be specific, the network device includes two layers: the gNB and the TRPs. Optionally, the wireless communications system 100 applicable to this application may alternatively be a one-layer architecture. For example, the architecture shown in FIG. 1 includes only TRPs but does not include the gNB. Alternatively, the architecture shown in FIG. 1 includes only the gNB but does not include the TRPs. In these architectures, operations and/or procedures performed by the network device and described in the embodiments of this application may be separately performed by the TRPs or performed by the gNB.

The wireless communications system in this application includes but is not limited to a global system for mobile communications (GSM) system, a code division multiple access (CDMA) system, and a wideband code division multiple access (WCDMA) system, a general packet radio service (GPRS), a long term evolution (LTE) system, an LTE frequency division duplex (HDD) system, LTE time division duplex (TDD) system, a universal mobile telecommunications system (UMTS), a worldwide interoperability for microwave access (WiMAX) communications system, and three application scenarios of a next-generation 5G mobile communications system: enhanced mobile broadband (eMBB), ultra reliable and low latency communications (URLLC) and enhanced machine type of communication (eMTC) or new communications systems emerging in the future.

The network device in the embodiments of this application may be a base transceiver station (BTS) in a GSM system or in a CDMA system, or may be a NodeB (NB) in a WCDMA system, or may be an evolved NodeB (evolved nodeB, eNB, or eNodeB) in an LTE system, or may be a radio controller in a cloud radio access network (CRAN) scenario. Alternatively, the network device may be a relay station, an access point, an in-vehicle device, a wearable device, a network device in a future 5G network, or the like. This is not limited in this application.

The terminal device in the embodiments of this application may be referred to as user equipment (UE), a terminal (terminal), an access terminal, a subscriber unit, a subscriber station, a mobile station, a mobile console, a remote station, a remote terminal, a mobile device, a user terminal, a wireless communication device, a user agent, or a user apparatus. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in this application.

In addition, the beam mentioned in this application may also be referred to as a spatial filter, a spatial domain filter, or a spatial parameter. A beam used to send a signal may be referred to as a transmission beam (Tx beam), or may be referred to as a spatial domain transmit filter or a spatial domain transmit parameter. A beam used to receive a signal may be referred to as a reception beam (Rx beam), or may be referred to as a spatial domain receive filter or a spatial domain receive parameter. The transmission beam may be signal strength distribution formed in different directions in space after a signal is transmitted by an antenna. The receive beam may be signal strength distribution of a radio signal received from an antenna in different directions in space.

It should be understood that names of the foregoing listed spatial domain filters are merely examples, and should not constitute any limitation on this application. This application does not exclude a possibility that another term is defined in a future communications standard protocol to represent a same or similar meaning as the spatial domain filter described in this application.

In the embodiments of this application, the beam representation has a quasi co-location (QCL) relationship with a channel state indication reference signal (CSI-RS) or a synchronization signal block. The synchronization signal block includes at least one of a primary synchronization signal, a secondary synchronization signal, and a physical broadcast channel. The QCL relationship indicates that the sent data and the signal have same or similar values in terms of an average gain, a Doppler frequency shift, a Doppler spread, an average delay, a delay spread, and a spatial domain receiving parameter.

In the embodiments of this application, a transmission unit may include a transport block (TB), a code block (CB), a code block group (CBG), a codeword (CW), or the like.

Data of a transmission unit or a hybrid automatic repeat request (HARQ) process being "successfully received" may also be equivalently replaced with data of a transmission unit or an HARQ process being "correctly received". The two have the same meaning.

The following describes in detail technical solutions of methods for sending and receiving feedback information provided in this application.

This application proposes that a network device sends data to a terminal device by using a plurality of transmission units or HARQ processes having an association relationship. The terminal device returns a positive acknowledgement (ACK) to the network device when successfully receiving one of the plurality of transmission units or successfully receiving data of one of the plurality of HARQ processes. After receiving the ACK, the network device releases all HARQ processes related to the data, and may use these released HARQ processes to transmit new data.

In the embodiments of this application, "a plurality of" represents two or more than two. For example, the "a plurality of" may be any value of 2, 3, 4, 5, 6, 7, and 8. Alternatively, the value may be another value. Therefore, the plurality of transmission units in the embodiments of this application may be two or more TB s, or two or more CBs, or two or more CBGs, or two or more CWs, or two or more HARQ processes, or any combination of the foregoing.

Using the architecture shown in FIG. 1 as an example, the network device sends data to the terminal device 102 by using the TRP 1, the TRP 2, and the TRP 3. Each of the TRP 1, the TRP 2, and the TRP 3 transmits the data or different redundancy versions (RVs) of the data. Each TRP may transmit the data or different RVs of the data to the terminal device by using one or more beams. The terminal device receives the data or different RVs of the data from the TRP 1, the TRP 2, and the TRP 3, and separately decodes the data or the RVs of the data, or performs soft combination decoding, to obtain the data by decoding.

Figure 2:
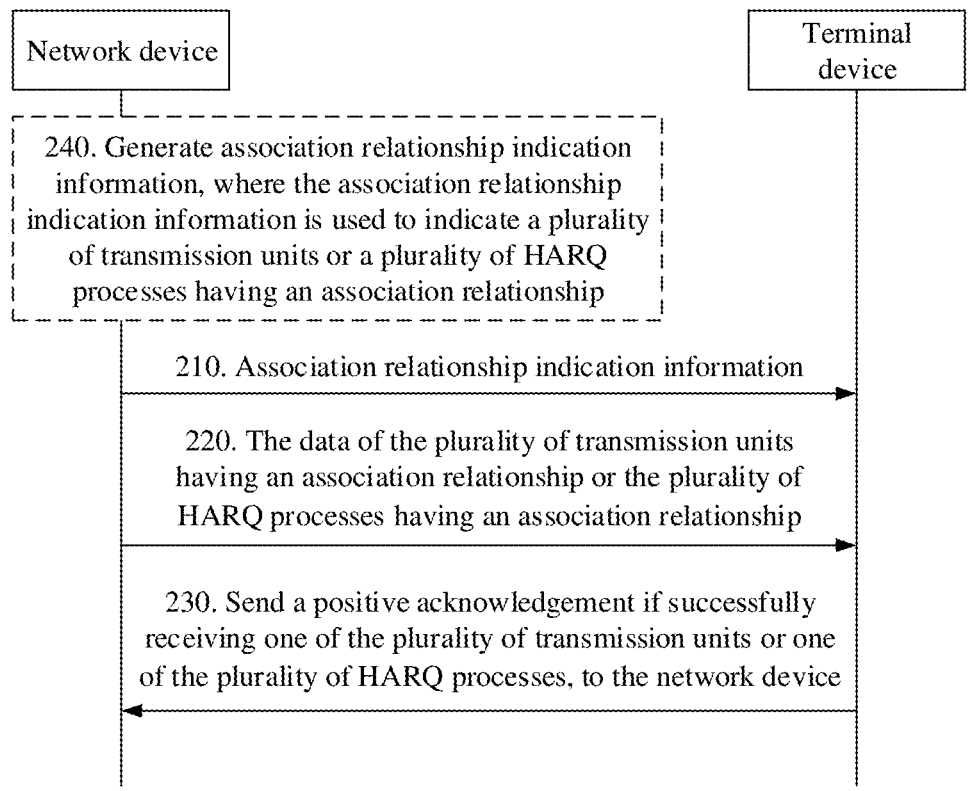
FIG. 2 is an interaction diagram of methods for sending and receiving feedback information according to this application.

FIG. 2 is an interaction diagram of methods 200 for sending and receiving feedback information according to this application.

Operation 210. A network device sends association relationship indication information to a terminal device. The terminal device receives the association relationship indication information from the network device.

The association relationship indication information is used to indicate a plurality of transmission units having an association relationship. Alternatively, the association relationship indication information may be used to indicate a plurality of HARQ processes having an association relationship.

In this application, the plurality of transmission units having an association relationship carry same data, or carry a same part of data, or carry same or different redundancy versions of same data. The plurality of transmission units may be transmitted by using a plurality of different HARQ processes, or may be transmitted by using one HARQ process.

Operation 220. The network device sends data of the plurality of transmission units having an association relationship or the plurality of HARQ processes having an association relationship to the terminal device. The terminal device receives, from the network device based on the association relationship indication information, the data of the plurality of transmission units or the plurality of HARQ processes having an association relationship.

In operation 210 and operation 220, the network device may send the association relationship indication information and the plurality of transmission units or the plurality of HARQ processes having an association relationship to the terminal device by using same or different beams and/or same or different TRPs. This is not limited in this application.

Operation 230. If the terminal device successfully receives one of the plurality of transmission units, or successfully receives data of one of the plurality of HARQ processes, the terminal device sends a positive acknowledgement to the network device.

The positive acknowledgement is used to indicate that the terminal device successfully receives the data that is sent by the network device by using the plurality of transmission units or the plurality of HARQ processes.

In the technical solutions of this application, the terminal device performs a "logical OR" operation on whether the data of the plurality of transmission units or the plurality of HARQ processes having an association relationship is successfully received, and feeds back a positive acknowledgement message to the network device based on a result of the logical OR. The "logical OR" herein is a type of logical operation, and indicates that the return result is true as long as one of one or more operands involved in the "logical OR" operation is true. In this application, specifically, for the plurality of transmission units sent by the network device, as long as one transmission unit is successfully received, the terminal device returns a positive acknowledgement indicating that the transmission unit is successful received to the network device. Alternatively, for the plurality of HARQ processes sent by the network device, as long as data of one HARQ process is successfully received, the terminal device feeds back a positive acknowledgement indicating that the data of the HARQ process is successfully received to the network device. A transmission unit is used as an example. If one transmission unit being successfully received by the terminal device corresponds to an ACK, one transmission unit not being successfully received corresponds to a NACK. The terminal device performs a "logical OR" operation on whether the plurality of transmission units are successfully received, and if a result of the logical OR operation is an ACK, feeds back a positive acknowledgement to the network device. If a result of the logical OR operation is a NACK, the terminal device feeds back a negative acknowledgement to the network device. According to a principle of the "logical OR" operation, it can be learned that, in the technical solutions of this application, the terminal device sends a positive acknowledgement to the network device as long as one transmission unit can be successfully received, or as long as data of one HARQ process is successfully received.

It should be understood that the terminal device successfully receiving one transmission unit means that the terminal device can successfully receive data carried in the transmission unit. Therefore, the terminal device sends a positive acknowledgement to the network device as long as one transmission unit is successfully received.

It should be noted that, the terminal device performing a logical OR operation on whether the plurality of transmission units are successfully received does not mean that the terminal device needs to receive each transmission unit. For example, as long as one of the plurality of transmission units having an association relationship is successfully received, the terminal device may not continue to receive another transmission unit. Alternatively, when the network device transmits data to the terminal device by using a plurality of HARQ processes having an association relationship, as long as data of one HARQ process is successfully received, the terminal device may not continue to receive data of another HARQ process.

In the technical solutions of this application, the network device sends a plurality of transmission units or a plurality of HARQ processes having an association relationship to the terminal device. The terminal device sends a positive acknowledgement to the network device when successfully receiving one of the plurality of transmission units or successfully receiving data of one of the plurality of HARQ processes. After receiving the positive acknowledgement from the terminal device, the network device may release HARQ processes corresponding to the plurality of transmission units. The released HARQ process can be used for transmitting new data or for other purposes, thereby reducing resource waste.

Optionally, before operation 210, operation 240 may be further included.

Operation 240. The network device generates the association relationship indication information.

After determining the plurality of transmission units or the plurality of HARQ processes used to transmit data to the terminal device, the network device may generate the association relationship indication information. In operation 210, the association relationship indication information is sent to the terminal device, so that the terminal device learns which transmission units or HARQ processes have an association relationship.

In an implementation, before the network device sends association relationship indication information to the terminal device, the method further includes: the network device sending transmission mode indication information to the terminal device, where the transmission mode indication information is used to indicate a transmission mode used by the network device to transmit the plurality of transmission units having an association relationship. The transmission mode may include any one of the following:

the plurality of transmission units are transmitted by using a plurality of different HARQ processes, and different transmission units carry same data;

the plurality of transmission units are transmitted by using a plurality of different HARQ processes, and different transmission units carry different redundancy versions of same data; or the plurality of transmission units are transmitted by using one HARQ process, and different transmission units carry different redundancy versions of same data; or the plurality of transmission units are transmitted by using a plurality of different HARQ processes, and different transmission units carry a same part of data.

In this embodiment of this application, the network device sends the transmission mode indication information to the terminal device, to indicate, to the terminal device, the transmission mode used by the network device to transmit data. In other words, after receiving the transmission mode indication information, the terminal device may learn that the network device will enable the foregoing transmission modes provided in this application to transmit data. Specifically, the network device may specify one transmission as one of the foregoing transmission modes. Correspondingly, after receiving the transmission mode indication information, the terminal device also performs feedback to the network device by using a feedback mode provided in this application, to indicate, to the network device, whether data transmitted by the network device by using a plurality of transmission units or a plurality of HARQ processes is correctly received.

When the terminal device provides feedback, to the network device, indicating whether data transmitted by the network device by using the plurality of transmission units is correctly received, the terminal device may utilize a plurality of feedback modes. For example, for each of the foregoing transmission modes, the terminal device may use a corresponding feedback mode. Alternatively, in some implementations, for the foregoing plurality of different transmission modes, the terminal device may use a same or similar feedback mode. Further, the terminal device may provide a positive acknowledgement as feedback to the network device in a plurality of manners when at least one transmission unit is successfully received. For example, one acknowledgement may be sent, or a plurality of acknowledgements may be sent. Further, in addition to feeding back a positive acknowledgement, the terminal device may transmit as feedback a negative acknowledgement in an HARQ process corresponding to a transmission unit that is not successfully received.

Optionally, if the terminal device successfully receives one of the plurality of transmission units having an association relationship, or successfully receives data of one of the plurality of HARQ processes having an association relationship, that the terminal device sends a positive acknowledgement to the network device includes: when successfully receiving one of the plurality of transmission units, the terminal device sends a positive acknowledgement in an HARQ process corresponding to at least one of the plurality of transmission units, where the at least one transmission unit may be any one of the plurality of transmission units, or the at least one transmission unit is at least one of transmission units that are in the plurality of transmission units having an association relationship and that are successfully received by the terminal device; or when the terminal device successfully receives the data of one of the plurality of HARQ processes, the terminal device sends a positive acknowledgement on at least one of the plurality of HARQ processes, where the at least one HARQ process may be any one of the plurality of HARQ processes, or the at least one HARQ process may be at least one of HARQ processes that are in the plurality of HARQ processes having an association relationship and that are successfully received by the terminal device.

In this embodiment of this application, when successfully receiving some (for example, one or more) of the plurality of transmission units, the terminal device may send a positive acknowledgement in an HARQ process corresponding to any one or more of the plurality of transmission units. Alternatively, the terminal device may feed back a positive acknowledgement only in an HARQ process corresponding to a transmission unit that is successfully received.

Optionally, in addition to sending a positive acknowledgement in the HARQ process corresponding to the transmission unit that is successfully received, the terminal device may further send a negative acknowledgement in a transmission unit that is not successfully received.

However, further, it is considered that although resource waste is reduced by using logic or operations, the network device may be incapable of correctly determining link quality of each link. For example, the network device sends data to UE by using an HARQ #0 and an HARQ #1. Specifically, the network device separately maps the data to TB s of the HARQ #0 and the HARQ #1. The HARQ #0 is sent by using a link 1, and the HARQ #1 is sent by using a link 2. If the TB of the HARQ #0 is correctly received by the UE, but the TB of the HARQ #1 is not correctly received, and the UE feeds back one ACK or two ACKs to the network device, it indicates that the data is correctly received. However, actually, the data on the link 2 is not correctly received. If the network device receives only the ACK fed back by the UE, the network device does not learn actual link quality of the link 1 and the link 2. If the network device considers that there is not difference in the link quality of the link 1 and the link 2 and both link quality is good, the link quality of the link 2 may be incorrectly transmitted.

To avoid this problem, the method further includes:

the terminal device feeds back (in this application the terms "feeds back" and "transmits as feedback" are interchangeable) a positive acknowledgement and first link performance indication information to the network device in an HARQ process corresponding to at least one of transmission units that are in the plurality of transmission units and that are not successfully received by the terminal device, where the first link performance indication information is used to indicate link quality of the HARQ process corresponding to the at least one of the transmission units that are not successfully received by the terminal device; or the terminal device sends a positive acknowledgement and second link performance indication information to the network device in at least one of HARQ processes that are in the plurality of HARQ processes and that are not successfully received by the terminal device, where the second link performance indication information is used to indicate link quality of the at least one of the HARQ processes that are not successfully received by the terminal device.

In other words, in addition to sending a positive acknowledgement to the network device, the terminal device may further send link performance indication information to the network device. The link performance indication information is used to indicate link quality of an HARQ process corresponding to the positive acknowledgement. Herein, link quality of one link specifically refers to performance of whether data on the link is correctly received.

It should be understood that, when successfully receiving one transmission unit, the terminal device may send a positive acknowledgement to the network device in an HARQ process corresponding to each of the plurality of transmission units having an association relationship. However, actually, some transmission units are not successfully received. Therefore, the link performance indication information may be sent on HARQ processes corresponding to the transmission units that are not successfully received, to indicate link quality of the HARQ processes corresponding to the transmission units that are not successfully received. In this way, the network device can learn a real status of each link, and adjust a channel quality modulation and coding policy based on link quality of each link when performing next data transmission, thereby improving the transmission efficiency.

Optionally, the terminal device may separately send the link performance indication information on a corresponding physical uplink control channel (PUCCH) or a corresponding physical uplink shared control channel (PUSCH). On one hand, an ACK or a NACK indicating whether the data is correctly received may be indicated to the network device, and on the other hand, link quality may be indicated to the network device. To improve reliability, the terminal device may send the link performance indication information on uplink resources respectively corresponding to a plurality of different HARQ processes. For example, an uplink resource corresponding to the HARQ #0 is a PUCCH #0, and an uplink resource corresponding to the HARQ #1 is a PUCCH #1. The terminal device sends the link performance indication information on both the PUCCH #0 and the PUCCH #1.

The terminal device involved in this specification may perform one or more of the following types of "logical OR" operations: TB-level ACK or NACK "logical OR" operation; CBG-level ACK or NACK "logical OR" operation; and CB-level ACK/NACK "logical OR" operation.

1. TB-Level ACK or NACK "Logical OR" Operation.

The UE receives a plurality of TBs from the network device. The UE performs a "logical OR" operation based on whether the plurality of TBs are successfully received, and feeds back a result of the logical OR to the network device.

For example, the UE receives data of two HARQ processes from the network device. The UE feeds back, by using the TBs, whether the data of the two HARQ processes is correctly received.

Assuming that in a first case, the first TB is correctly received by the UE, the first TB corresponds to an ACK. If the second TB is also correctly received, the second TB also corresponds to an ACK. A logical OR operation is performed on the two ACKs, and a result is an ACK. The UE feeds back the ACK to the network device.

Assuming that in a second case, the first TB is correctly received, the first TB corresponds to an ACK. If the second TB is not correctly received or not decoded, the second TB corresponds to a NACK. A logical OR operation is performed on the ACK corresponding to the first TB and the NACK corresponding to the second TB, and a result is an ACK. The UE still feeds back the ACK to the network device.

Assuming that in a third case, the first TB is not correctly received (for example, incorrectly decoded or not decoded), the first TB corresponds to a NACK. If the second TB is correctly received, the second TB corresponds to an ACK. A logical OR operation is performed on the NACK corresponding to the first TB and the ACK corresponding to the second TB, and a result is an ACK. The UE feeds back the ACK to the network device.

Assuming that in a fourth case, the first TB is not correctly received and the second TB is not correctly received, both the first TB and the second TB correspond to a NACK. A result of a logical OR operation performed on the NACK corresponding to the first TB and the NACK corresponding to the second TB is a NACK. Therefore, the UE feeds back the NACK to the network device.

As described above, the terminal device may add link performance indication information to a positive acknowledgement fed back to the network device, to indicate link quality of a link corresponding to the positive acknowledgement. For example, in the second case, the terminal device may add 1-bit link performance indication information to an ACK fed back to the network device. For example, the UE feeds back 11 to the network device for the HARQ #0, and feeds back 10 to the network device for the HARQ #1. 1 or 0 in the first bit indicates whether the UE correctly receives the data, and 1 or 0 in the second bit indicates link quality of a link corresponding to the HARQ process. Therefore, the UE feeds back 11 to the network device for the HARQ #0, indicating that the data is correctly received, and the data on the link for sending the HARQ #0 is correctly received. The UE feeds back 10 to the network device for the HARQ #1, indicating that the data is correctly received, but the data on the link for sending the HARQ #1 is not correctly received.

2. CBG-Level ACK or NACK "Logical OR" Operation.

The terminal device receives a plurality of CBGs from the network device. The terminal device performs a "logical OR" operation based on whether the plurality of CBGs are successfully received, and feeds back a result of the logical OR to the network device.

For example, the terminal device receives data of two HARQ processes from the network device. The terminal device feeds back, at a CBG level, whether the data transmitted in the two HARQ processes is correctly received.

For example, one TB has four CBGs, and the following cases are considered:

Assuming that in a first case, ACK/NACK information of a CBG of the first TB is 1111, and ACK/NACK information of a CBG of the second TB is 1111, a result of logical OR is 1111. The terminal device may feed back 1111 to the network device in the first HARQ process. Alternatively, the terminal device feeds back 1111 to the network device in the second HARQ process. Alternatively, the terminal device feeds back 1111 in the two HARQ processes.

Assuming that in a second case, ACK/NACK information of a CBG of the first TB is 1111, and ACK/NACK information of a CBG of the second TB is 0000, a result of logical OR is 1111. The UE may feed back 1111 in the first HARQ process. Alternatively, the terminal device feeds back 1111 or 0000 in the second HARQ process. Alternatively, the terminal device feeds back 1111 in the two HARQ processes.

Assuming that in a third case, ACK/NACK information of a CBG of the first TB is 0011, and ACK/NACK information of a CBG of the second TB is 1100, a result of logical OR is 1111. The terminal device may feed back 1111 in the first HARQ process. Alternatively, the terminal device feeds back 1111 in the second HARQ process. Alternatively, the terminal device feeds back 1111 in the two HARQ processes.

Assuming that in a fourth case, if ACK/NACK information of a CBG of the first TB is 0001, and ACK/NACK information of a CBG of the second TB is 1100, a result of logical OR is 1101. The terminal device may feed back 1101 in the first HARQ process. Alternatively, the terminal device feeds back 1101 in the second HARQ process. Alternatively, the terminal device feeds back 1101 in the two HARQ processes.

Similar to the foregoing description of adding the link performance indication information to the positive acknowledgement, in an embodiment in which whether data is correctly received is fed back to the network device by using a CBG-level logical OR operation, the UE may also add the link performance indication information to ACK/NACK information fed back by each HARQ process, to indicate link quality of a link corresponding to each HARQ process. For example, in the second case, the terminal device may add 1-bit link performance indication information to ACK/NACK information fed back. For example, one bit 1 or 0 is added before, after, or in the middle of 1111. For example, the UE feeds back 11111 or 01111 to a network side, where the first bit 0 or 1 indicates whether data transmitted on the link is correctly received, so that the network side adjusts a coding policy according to ACK/NACK performance of each link.

3. CB-Level ACK/NACK "Logical OR" Operation.

The terminal device receives a plurality of CBs from the network device. The terminal device feeds back a result of logical OR to the network device based on whether the plurality of CBs are correctly received.

For example, the terminal device receives data of two of HARQ processes from the network device, and whether the data of the two HARQ processes is correctly received is fed back at a CB level.

For example, one CBG or TB has four CBs, and the following cases are considered.

Assuming that in a first case, ACK/NACK information of a CB of the first CBG or TB is 1111, and ACK/NACK information of a CB of the second CBG or TB is 1111, a result of logical OR is 1111. The terminal device feeds back an ACK to the network device, to indicate that the data carried on the CBG or TB is correctly received. The terminal device may transmit as feedback: an ACK for the CBG or TB in the first HARQ process; an ACK for the CBG or TB in the second HARQ process; or an ACK for the CBG or TB in the two HARQ processes.

Assuming that in a second case, ACK/NACK information of a CB of the first CBG or TB is 1111, and ACK/NACK information of a CB of the second CBG or TB is 0000, a result of logical OR is 1111. The terminal device feeds back an ACK to the network device, to indicate that the data carried on the CBG or TB is correctly received. The terminal device may transmit as feedback: an ACK for the CBG or TB in the first HARQ process; an ACK or a NACK for the CBG or TB in the second HARQ process; or an ACK for the CBG or TB in the two HARQ processes.

Assuming that in a third case, ACK/NACK information of a CB of the first CBG or TB is 0011, and ACK/NACK information of a CB of the second CBG or TB is 1100, a result of logical OR is 1111. The terminal device may transmit as feedback: an ACK for the CBG or TB in the first HARQ process; an ACK for the CBG or TB in the second HARQ process; or an ACK for the CBG or TB in the two HARQ processes.

Assuming that in a fourth case, ACK/NACK information of a CB of the first CBG or TB is 0001, and ACK/NACK information of a CB of the second CBG or TB is 1100, a result of logical OR is 1101. The terminal device may transmit as feedback: a NACK for the CBG or TB in the first HARQ process; a NACK for the CBG or TB in the second HARQ process; or a NACK for the CBG or TB in the two HARQ processes.

Similarly, the terminal device may also add link performance indication information to a positive acknowledgement message fed back for each HARQ process, where the link performance indication information is used to indicate link quality corresponding to each HARQ process. For example, in the second case, the terminal device may add 1-bit link performance indication information to ACK/NACK information fed back. The added 1-bit link performance indication information is used to indicate whether the data transmitted on the link is correctly received, so that the network side determines a channel modulation and coding policy when performing next data transmission.

In these types of logic OR operation manners, if the logic OR operation is based on a CBG level, division of CBGs of a plurality of TBs having an association relationship may be consistent or inconsistent. Similarly, if the logical OR operation is based on a CB level, division of CBs of a plurality of TBs having an association relationship may also be consistent or inconsistent.

As described above, the network device sends data to the terminal device by using a plurality of transmission units or a plurality of HARQ processes having an association relationship. The plurality of transmission units or the plurality of HARQ processes having an association relationship carry same data, or carry a same part of data, or carry different redundancy versions of same data. The following describes manners in which the plurality of transmission units or the plurality of HARQ processes carry data.

Manner 1

The network device transmits an original bit stream of one piece of data by using a plurality of TBs, CBGs, CBs, or CWs having an association relationship. In other words, the plurality of TBs, CBGs, CBs, or CWs having an association relationship carry a same bit stream. Further, the plurality of TBs, CBGs, CBs, or CWs are transmitted by using a plurality of beams and/or TRPs. Further, different HARQ processes are transmitted on different beams and/or TRPs.

The terminal device feeds back an ACK to the network device as long as one of the TBs, CBGs, CBs, or CWs is correctly received. After receiving the ACK, the network device releases all HARQ processes related to the data.

Figure 3:
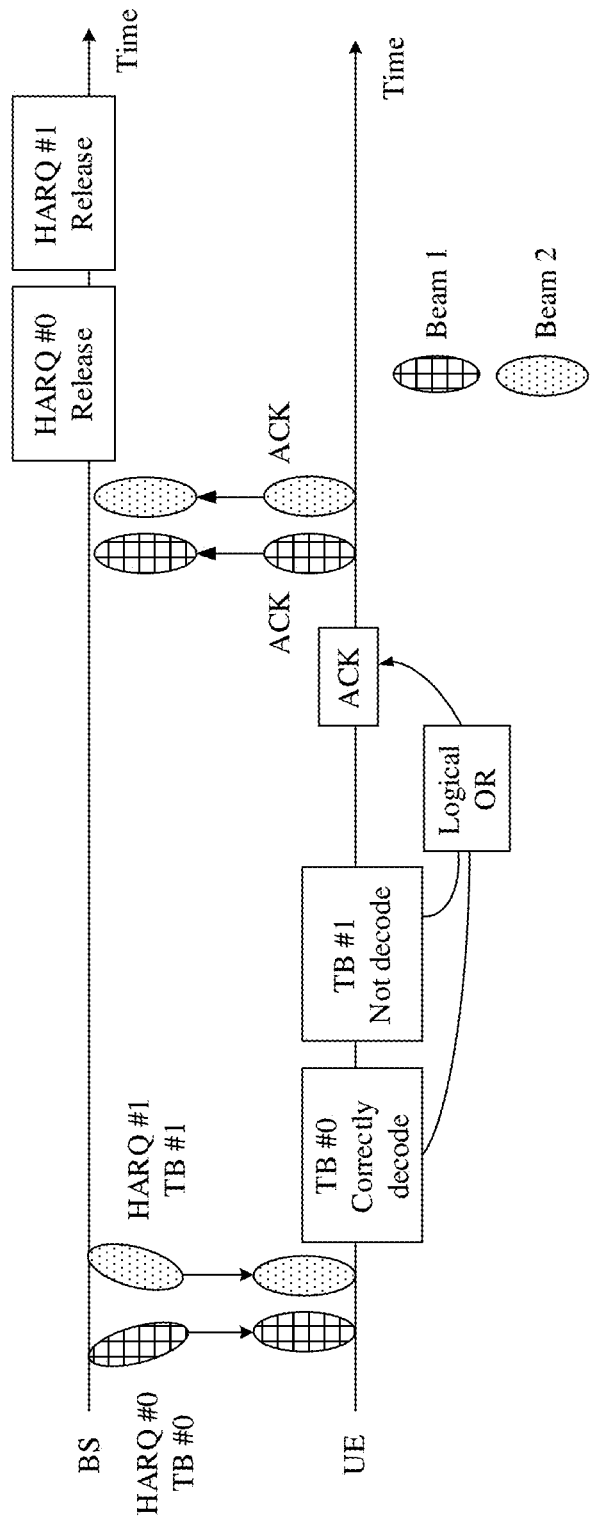
FIG. 3 is an example of a method for sending and receiving feedback information according to this application.

The following describes Manner 1 by using an example with reference to FIG. 3.

Referring to FIG. 3, FIG. 3 is an example of methods for sending and receiving feedback information according to this application. As shown in FIG. 3, the network device (e.g., the base station (BS) in FIG. 3) transmits same data to the UE by using a TB #0 in an HARQ process 0 (HARQ #0 in FIG. 3) and a TB #1 in an HARQ process 1 (HARQ #1 in FIG. 3). The HARQ #0 is sent by using a beam 1 or a TRP 1, and the HARQ #1 is sent by using a beam 2 or a TRP 2. The UE decodes the TB #0 and the TB #1 after receiving the TB #0 and the TB #1. The UE may not decode the TB #1 after correctly decoding the TB #0. The UE may alternatively decode the TB #0 and the TB #1. As described above, the UE feeds back whether the data is correctly received to the network device according to "logical OR". Therefore, because the TB #0 has been correctly decoded, a decoding result of the TB #0 is an ACK, but the TB #1 is not decoded, and a decoding result of the TB #1 is a NACK. The result of logical OR performed on the ACK and the NACK is an ACK. The UE separately sends the ACK to the network device on the beam 1 and the beam 2, to indicate that the data has been correctly received. After receiving the ACK fed back by the terminal device, the network device releases the HARQ process used to transmit the data, namely, releases the HARQ #0 and the HARQ #1.

The releasing the HARQ process by the network device may be transmitting new data on the released HARQ process. The terminal device receives downlink control information (DCI) from the network device, and determines, based on a new data indicator (NDI) field in the DCI, that a data bit is reversed, to consider that the HARQ process transmits new data, to further clear original data in a buffer (buffer) and load the new data.

It should be understood that the HARQ #0 and the HARQ #1 shown in FIG. 3 may be sent by one TRP, or may be sent by two TRPs. This is not limited herein. In addition, the HARQ #0 and the HARQ #1 are sent respectively by using the beam 1 and the beam 2, or certainly, the HARQ #0 and the HARQ #1 may be sent by using only one beam. FIG. 3 is merely an example.

In the technical solutions of this application, the UE feeds back whether one piece of data is successfully received to the network device by using a "logical OR" operation. In this way, when the network device transmits same data to the UE by using a plurality of HARQ processes, as long as data carried in one TB in one HARQ process is successfully received, even if the data transmitted in all other HARQ processes is not successfully received, the UE still feeds back an ACK to the network device by using a logical OR operation. The network device no longer uses the HARQ process corresponding to a TB that is not successfully received to retransmit the data, but releases all HARQ processes used to transmit the data. The released HARQ processes may be used for transmission of new data or for other purposes, thereby reducing resource waste.

In Manner 1, the network device may specifically allocate an HARQ process to perform reliable transmission (also referred to as robust transmission) on data that needs to be sent to the terminal device.

The network device may add association relationship indication information to one or more pieces of information of radio resource control (RRC) information, system information, a media access control (MAC) control element (CE), or downlink control information (DCI), or a physical broadcast channel (PBCH). The association relationship indication information is specifically used to indicate a plurality of TBs, CBGs, CBs, or CWs having an association relationship. Alternatively, the association relationship indication information is used to indicate a plurality of HARQ processes having an association relationship. The plurality of TBs, CBGs, CBs, or CWs having an association relationship are used to transmit same data or different RVs of the data. Alternatively, data transmitted by the plurality of transmission units is the same or correlated. In other words, data transmitted by the plurality of TBs or CBGs or CBs or CWs having an association relationship may be all the same or partially the same, or may be different redundancy versions of the same data. In Manner 1, the plurality of transmission units having an association relationship carry same data.

The network device may introduce a concept of a repeated HARQ process into an RRC or system message, a MAC-CE, or DCI, and specifically allocate an HARQ process to perform robust transmission. The repeated HARQ process specifically includes at least one of the following parameters:

(1) repeated_harq_transmission: ON/OFF;

(2) repeated_harq_process: {harq_process #0, harq_process #1}; and (3) repeated_harq_feedback: ON/OFF.

It should be understood that the foregoing row (1) indicates whether repeated HARQ transmission (repeated_harq_transmission) is on or off. Generally, when the repeated HARQ transmission of row (1) is on, row (2) is used to configure a plurality of HARQ processes having an association relationship. The association relationship between harq_process #0 and harq_process #1 herein is merely an example. The network device may alternatively configure an association relationship between more than two HARQ processes or a plurality of transmission units. Row (3) indicates whether feedback of this transmission mode for repeated HARQ transmission is on or off.

The terminal device learns, from the RRC message, the system message, or the DCI, that a switch of repeated_harq_transmission is in an on (that is, "ON") state, and learns that the network device enables robust transmission. In this case, the terminal device may learn, based on an association relationship configured in repeated_harq_process, a plurality of HARQ processes having an association relationship. Subsequently, the terminal device performs feedback to the network device based on the method for sending feedback information provided in this application. The terminal device may also set a switch of repeated_harq_feedback to an on state, namely, the state of repeated_harq_feedback is specifically "ON".

It should be understood that one HARQ process is usually used to transmit one TB or transmit one CBG. One TB may be divided into a plurality of CBs. Each one or more CBs may be grouped into one CBG.

The network device transmits same data by using a plurality of different HARQ processes, and the same data may be transmitted by using at least one of a TB, a CBG, a CB, and a CW. In other words, the network device carries same data by using a plurality of TBs, CBGs, CBs, or CWs. The plurality of TBs, CBGs, CBs, or CWs are respectively mapped to a plurality of different HARQ processes. The plurality of different HARQ processes may be separately transmitted by using same or different beams, and/or the plurality of different HARQ processes may be separately transmitted by using same or different TRPs.

The terminal device receives, from the network device, data transmitted in the plurality of different HARQ processes. The received data may be separately decoded or combined for decoding. The terminal device performs a "logical OR" operation based on whether the data of the plurality of different HARQ processes is correctly decoded, and sends a result of the logical OR to the network device, to feed back whether the data is correctly received to the network device. The terminal device feeds back whether the data is correctly received to the network device based on the result of "logical OR". To be specific, the terminal device feeds back a positive acknowledgement ACK to the network device as long as one TB, CBG, CB, or CW is correctly received. After receiving the ACK fed back by the terminal device, the network device releases all HARQ processes used to transmit the data. The released HARQ processes can be used to transmit new data.

For the UE, the UE receives data transmitted in a plurality of different HARQ processes, and in TBs, CBGs, CBs, or CWs corresponding to the plurality of different HARQ processes, as long as one TB, CBG, CB, or CW is correctly received, the UE may indicate to a physical layer of the UE to no longer demodulate another one or more TBs or CBGs or CBs or CWs. Alternatively, the physical layer of the UE may continue to demodulate another one or more other TBs, CBGs, CBs, or CWs. The demodulated information is transmitted to higher layers of the UE. The higher layers of the UE herein include a MAC layer and an RRC layer of the UE.

In conclusion, the terminal device receives, from the network device, data transmitted in a plurality of different HARQ processes having an association relationship, and the terminal device feeds back whether the data is correctly received to the network device. The following options may be available:

(1) The terminal device may feed back an ACK only for a correctly demodulated HARQ process, so that uplink overheads and interference can be reduced.

(2) The terminal device may feed back an ACK for all HARQ processes for transmitting the data, so that uplink overheads can be reduced and spectral efficiency can be improved.

(3) The terminal device may feed back an ACK for a correctly demodulated HARQ process, and feed back a NACK for an incorrectly demodulated HARQ process. In this way, the network device can be assisted in adjusting a coding and modulation policy used when data is transmitted on each link, so that a link corresponding to an HARQ process that is not correctly demodulated can be correctly demodulated during subsequent data transmission.

(4) The terminal device may feed back an ACK for a correctly demodulated HARQ process, and feed back special state information for an incorrectly demodulated HARQ process. The state information is used to indicate that the terminal device correctly receives data transmitted in another HARQ process, but the HARQ process is not correctly demodulated. In this way, the network device can be assisted in adjusting an adjustment coding policy used when a link corresponding to an incorrectly demodulated HARQ process transmits data subsequently, so that the link can be correctly demodulated as much as possible.

(5) When the plurality of HARQ processes having an association relationship are incorrectly decoded, the terminal device may feed back a NACK to the network side, to indicate the network device to continue to perform retransmission.

For the network device, after receiving an ACK fed back by the terminal device for one of the plurality of HARQ processes having an association relationship, the network device releases all HARQ processes having an association relationship, and uses the released HARQ processes to transmit new data. For the description of releasing the HARQ processes by the network device, refer to the foregoing description.

If two pieces of DCI are independently scheduled, the PDSCH (Physical Downlink Shared Channel)-to-HARQ feedback time may be one, two, or more times. In terms of the feedback time, a later transmitted TB may prevail, or a first correctly decoded TB may prevail.

Optionally, the terminal device may introduce a retransmission time window (repeated_harq_time_window). The retransmission time window is a mechanism in which the terminal device feeds back an ACK or a NACK to the network device. A principle of the retransmission time window is that the terminal device starts a timer upon receiving data or information from the network device or starting from decoding the received data or information. In the retransmission time window, if the terminal device successfully decodes the received data or information, the terminal device feeds back an ACK to the network device, and stops timing of the timer. If the terminal device fails to decode the received data or information and the set retransmission time window times out, the terminal device feeds back a NACK to the network device. In this way, the network device may be notified to resend the data or information until the terminal device successfully receives the data or information.

Figure 4:
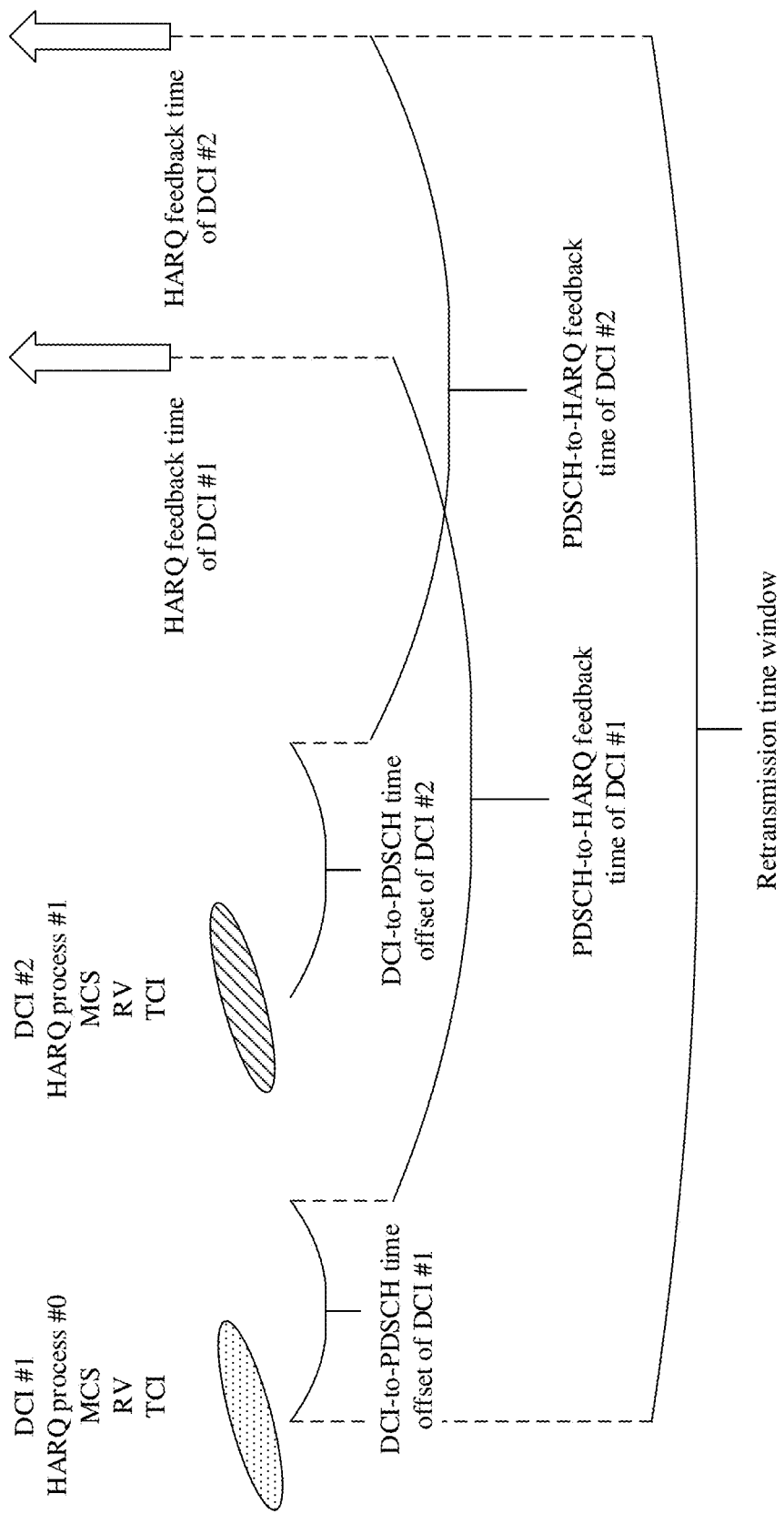
FIG. 4 is a schematic diagram of a retransmission time window.

FIG. 4 is a schematic diagram of a retransmission time window. As shown in FIG. 4, the repeated_harq_time_window may start timing from receiving the first DCI by the terminal device, or may start timing from decoding by the terminal device. If the decoding succeeds, the terminal device feeds back an ACK based on an indication of the first DCI, and stops timing of the window. If the decoding fails and the second DCI is not received in the window, the window times out and a NACK is fed back. If the second DCI is received in the window, the window is stopped, the HARQ timing is determined based on an indication of the second DCI, and ACK/NACK feedback is performed to the network device. A design of the retransmission time window makes the network device not transmit a plurality of HARQ processes each time even if the network device enables the repeated HARQ mode, thereby reducing a limitation on the network device.

Manner 2

The network device transmits an original bit stream of one piece of data by using a plurality of TBs, CBGs, CBs, or CWs having an association relationship. The plurality of TBs, CBGs, CBs, or CWs carry different redundancy versions after the original bit stream is encoded through a same channel. The plurality of redundancy versions are respectively mapped to a plurality of different HARQ processes.

In Manner 1, different HARQ processes are transmitted on different beams and/or TRPs, and each HARQ process transmits same data. Different from Manner 1, in Manner 2, different HARQ processes are transmitted on different beams and/or TRPs, and each HARQ process transmits different redundancy versions of same data.

Specifically, the network device may introduce a concept of repetition based on HARQ spatial bundling by using an RRC or system message, a MAC-CE, or DCI, and specifically allocate an HARQ process to perform robust transmission. The repetition based HARQ spatial bundling specifically includes:

(1) repetition based HARQ ACK spatialbundling: ON/OFF; and (2) repetition based HARQ ACK spatial bundling_feedback: ON/OFF.

Row (1) indicates whether repeated transmission based on the HARQ ACK spatial bundling is on or off. Row (2) indicates whether feedback based on the HARQ ACK spatial bundling is on or off.

The terminal device learns from the RRC message, the system message, or the DCI that a switch of repetition based HARQ ACK spatialbundling is in an on (that is, "ON") state, indicating that the network device enables transmission based on the HARQ ACK partial bundling. The terminal device learns, from the RRC message, the system message, the MAC-CE, or the DCI, that the switch of repetition based HARQ ACK spatialbundling is in an on (that is, "ON") state. The terminal device may also set the repetition based HARQ ACK spatial bundling_feedback to the "ON" state, and perform feedback to the network device based on the HARQ spatial bundling.

The network device notifies the terminal device of mapping a plurality of redundancy versions of one piece of data to a plurality of TBs in a same HARQ process or a plurality of TBs in a plurality of HARQ processes. Optionally, the plurality of TBs may be scheduled by one or more pieces of DCI. Optionally, each TB may have its own beam indication and time-frequency resource configuration. Optionally, the plurality of TBs may be time-domain repetition or space-domain repetition.

For example, the network device maps two redundancy versions of one piece of data to two TBs in one HARQ process: HARQ #0 {TB #1, TB #2}. The terminal device feeds back a positive acknowledgement to the network device as long as one TB is correctly received. After receiving the positive acknowledgement fed back by the terminal device, the network device releases the HARQ process for transmitting the data.

Specifically, after receiving the plurality of TBs in the HARQ process, the terminal device may select the following several behaviors.

(1) The terminal device decodes the data carried on each of the plurality of TBs, to obtain a decoding result; and then performs a logical OR operation on the decoding result of each TB, and feeds back a result of logical OR to the network device.

Herein, the decoding result of each TB is an ACK or a NACK. The ACK indicates that the TB is correctly decoded, and the NACK indicates that the TB is incorrectly decoded.

The following uses two TBs (denoted as a TB #1 and a TB #2) as an example to describe a second behavior that can be selected by the terminal device, as described in the following (2).

(2) The MAC layer or the PHY layer of the terminal device decodes the TB #1. If the TB #1 is correctly decoded, the TB #2 is not decoded, decoded data of the TB #1 is directly sent to a higher layer of the terminal device, the buffer is cleared, and one ACK or two ACKs are fed back to the network device. Whether the terminal device generates one ACK or two ACKs depends on whether the repetition based HARQ ACK spatial bundling_feedback is "ON" or "OFF". If the TB #1 is not correctly decoded, the decoding result of the TB #1 is buffered in the buffer, and the TB #2 continues to be decoded. If the TB #2 still fails to be decoded, soft combination is performed on the decoding result of the TB #2 and the decoding result of the buffered TB #1, to, if the soft combination is successful, generate and feed back one ACK or one ACK and one NACK. Similarly, whether the terminal device generates one ACK or generates one ACK and one NACK depends on whether the repetition based HARQ ACK spatial bundling_feedback is "ON" or "OFF". If the terminal device feeds back one ACK and one NACK to the network device, the network device performs a logical OR operation after receiving the ACK and the NACK. If a result of the logical OR operation is an ACK, it indicates that the terminal device correctly receives the data sent by the network device.

Figure 5:
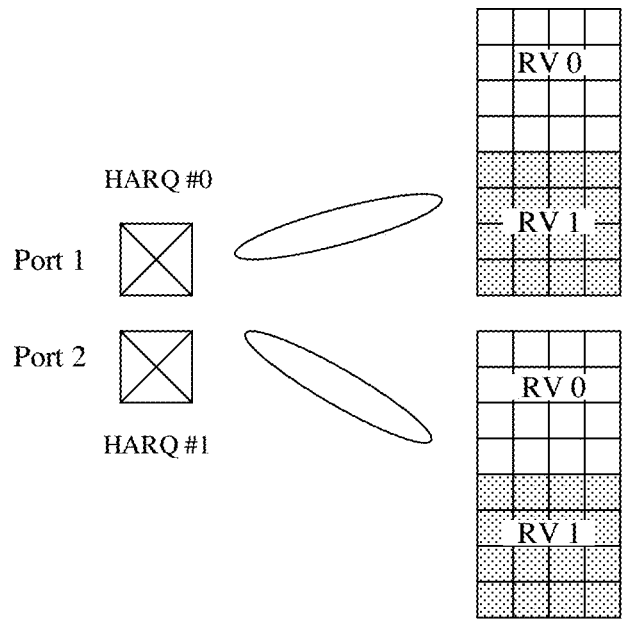
FIG. 5 is an example of mapping different redundancy versions of data to different TBs of the same HARQ process.

FIG. 5 is an example of mapping different redundancy versions of data to different TBs of a same HARQ process. As shown in FIG. 5, two redundancy versions (for example, an RV 0 and an RV 1 in FIG. 5) of one piece of data are mapped to an HARQ #0 and an HARQ #1. The HARQ #0 is sent by using a port 1, and the HARQ #1 is sent by using a port 2. In the HARQ process sent on each port, different redundancy versions may be sent by using different frequency domain locations.

In Manner 2, the terminal device may perform soft combination on two or more TBs, to improve a capability of resisting channel frequency selective fading.

In Manner 1 and Manner 2, the network device allocates a plurality of HARQ processes to same data. With reference to Manner 3, the following provides an embodiment in which the network device allocates only one HARQ process to same data.

Manner 3

The network device allocates one HARQ process to the data, and the HARQ process transmits different redundancy versions of the same data. The HARQ process is transmitted by using a plurality of beams and/or TRPs.

Figure 6:
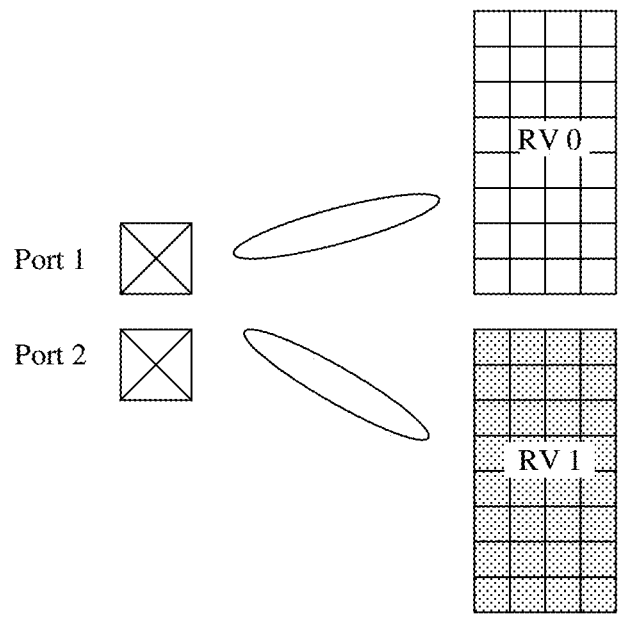
FIG. 6 is an example of transmitting different redundancy versions of same data by using one HARQ process.

The following describes Manner 3 with reference to FIG. 6.

Referring to FIG. 6, FIG. 6 is an example of transmitting different redundancy versions of same data by using one HARQ process. As shown in FIG. 6, the network device separately sends a same HARQ process by using two beams and/or TRPs, and the HARQ process transmits an RV 0 and an RV 1 of same data. For example, the RV 0 is transmitted through a port 1, and the RV 1 is transmitted through a port 2. Optionally, the RV 0 and the RV 1 may be sent by using different time domain locations and/or frequency domain locations. To enable the UE to successfully receive the two RVs, the network device separately indicates, by using a plurality of fields in DCI, a time-frequency resource of a PDSCH corresponding to each RV. After receiving the DCI, the UE demodulates a PDSCH based on a time-frequency resource of the PDSCH to receive the RV 0 and RV 1. After receiving the RV 0 and the RV 1, the UE performs soft combination decoding on the two RVs with other RVs of the HARQ process that have been received previously. If the decoding succeeds, the UE feeds back an ACK to the network device. After receiving the ACK, the network device releases the HARQ process for transmitting the data. For a process in which the network device and the terminal device release the HARQ process, refer to the foregoing description. If the soft combination decoding fails, a NACK is fed back to the network device. After receiving the NACK, the network device continues to transmit another RV of the data by using the HARQ process.

It should be understood that, different from Manner 2, only one HARQ process is allocated in Manner 3, and the HARQ process may carry different redundancy versions of same data. The HARQ process carrying different redundancy versions may be transmitted by using different beams and/or TRPs.

Manner 4

The network device transmits an original bit stream of one piece of data by using a plurality of TBs, CBGs, CBs, or CWs having an association relationship. Further, the plurality of TBs, CBGs, CBs, or CWs are transmitted by using a plurality of beams and/or TRPs. Different HARQ processes are used for transmission on different beams or TRPs, and data transmitted in different HARQ processes are partially the same.

The terminal device receives, from the network device, data transmitted in the plurality of HARQ processes. The terminal device feeds back an ACK to the network device as long as a TB, a CBG, a CB, or a CW in one HARQ process is correctly received, to indicate that the data is correctly received. After receiving the ACK fed back by the terminal device, the network device releases all HARQ processes for transmitting the data.

Figure 7:
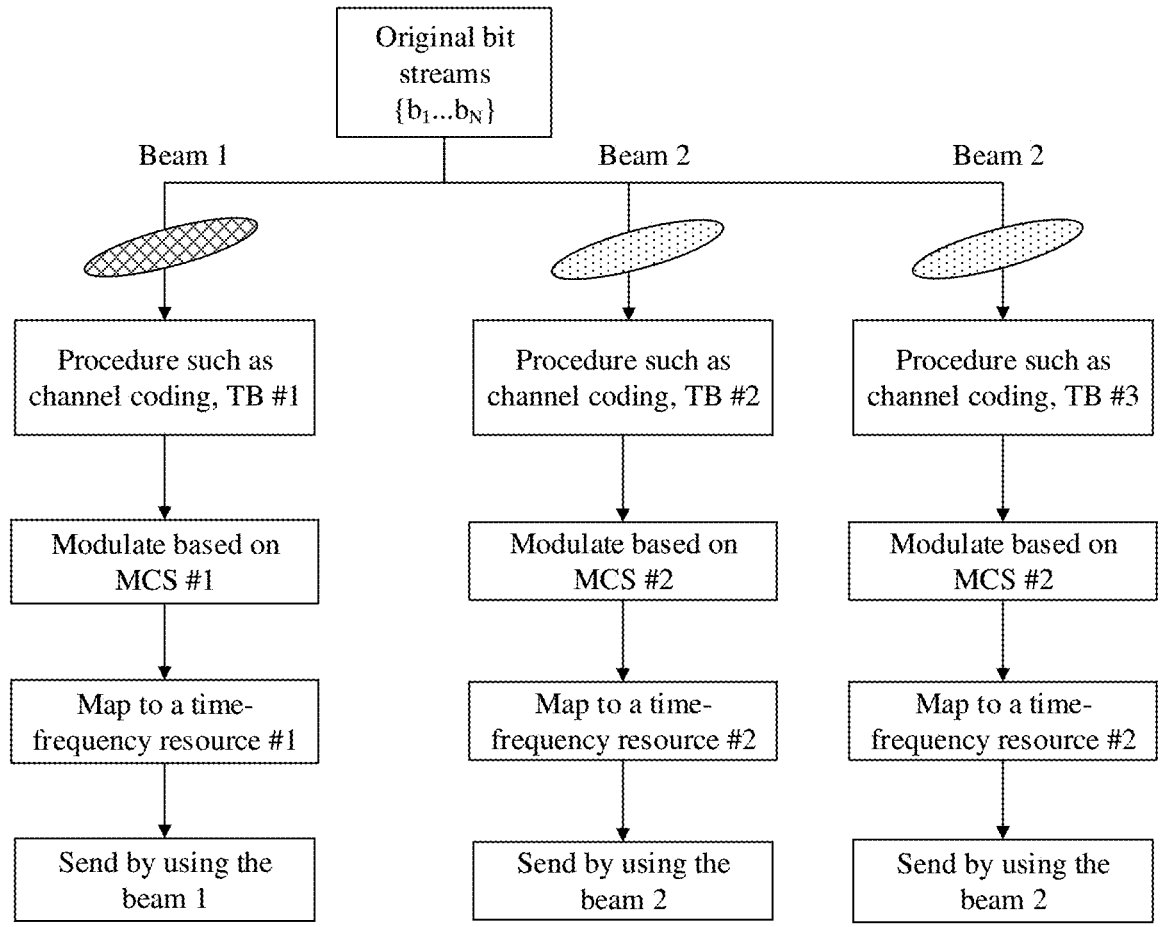
FIG. 7 is an example in which a network device performs reliable transmission.

Referring to FIG. 7, Manner 4 is described.

FIG. 7 is an example in which a network device performs reliable transmission. The network device copies an original bit stream of data into two copies, maps one copy to one TB (for example, a TB #1 in FIG. 7), and transmits the copy by using a beam 1. The other copy is mapped to two TBs (for example, a TB #2 and a TB #3 in FIG. 7), and transmitted by using a beam 2. In other words, the data carried in the TB #2 and the data carried in the TB #3 are respectively a part of the data carried in the TB #1. A sum of the data carried by the TB #2 and the TB #3 is the same as the data carried by the TB #1.

In Manner 4, the network device may also specifically allocate an HARQ process to perform robust transmission on the data. Details may be the same as Manner 1.

In Manner 4, the network device may also group TBs, and TBs in different groups transmit same data. That different groups of TBs transmit same data may represent the following possibilities:

(1) Some data in one TB is the same as data in another TB.

(2) Data of one CB in one TB is the same as data of another TB.

(3) Data of one CBG in one TB is the same as data of another TB.

(4) Data of one CBG in one TB is the same as data of one CB in another TB.

(5) Data of one TB is the same as a sum of data of the other N TBs, where N≥2 and is an integer.

Figure 8:
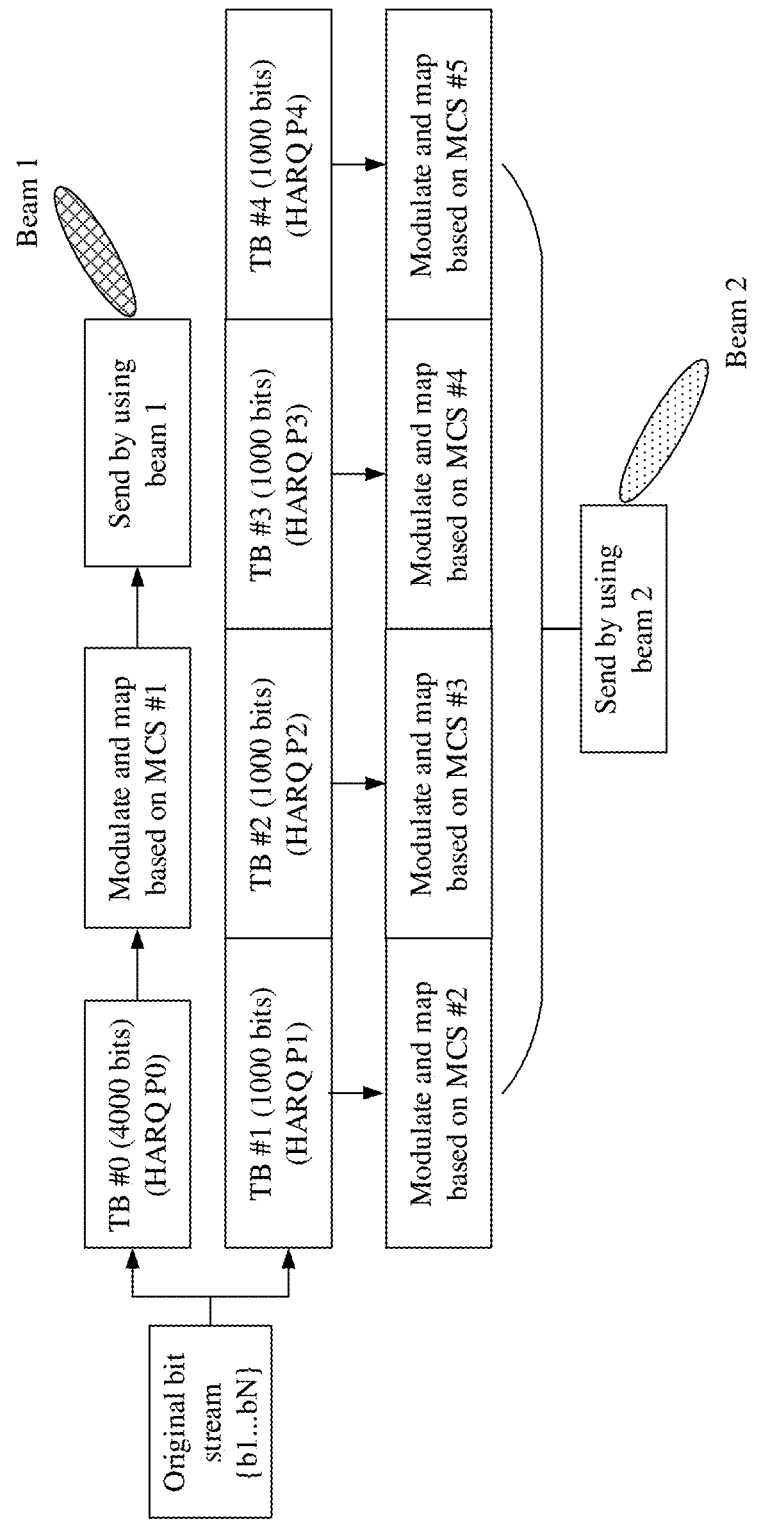
FIG. 8 is another example in which a network device performs reliable transmission.

For example, if N=4, it indicates that data of one TB is the same as a sum of data that carried by the other four TBs, as shown in FIG. 8. FIG. 8 is another example in which a network device performs reliable transmission. As shown in FIG. 8, the network device divides TBs into two groups, and TBs in the first group (a TB #0 and 4000 bits shown in FIG. 8) are transmitted by using an HARQ process 0 (an HARQ P0 shown in FIG. 8). Four TBs (a TB #1, a TB #2, a TB #3, and a TB #4 shown in FIG. 8, which are all 1000 bits each) in the second group are transmitted by using an HARQ process 1, an HARQ process 2, an HARQ process 3, and an HARQ process 4 (respectively an HARQ P1, an HARQ P2, an HARQ P3, and an HARQ P4 shown in FIG. 8). A sum of 1000 bits of each of the TB #1, the TB #2, the TB #3, and the TB #4 forms 4000 bits of the TB #0. In addition, TB #0 is modulated by using an MCS #1, and the TB #1, the TB #2, the TB #3, and the TB #4 are modulated by using the MCS #2, the MCS #3, the MCS #4, and the MCS #5 respectively. The plurality of HARQ processes may be transmitted by using same or different beams, and/or the plurality of HARQ processes may be transmitted by using same or different TRPs. The terminal device receives, from a network side, data transmitted by the plurality of HARQ processes, and the received data may be separately decoded or combined for decoding. For example, the HARQ P0 is sent by using a beam 1, and the HARQ P1, the HARQ P2, the HARQ P3, and the HARQ P4 are all sent by using a beam 2.

(6) Data of one CBG in one TB is the same as data of N CBGs in another TB.

According to the foregoing description, it is known that one TB may be divided into a plurality of CBs. Each one or more CBs may be grouped into one CBG. Different from the foregoing (2), the CB of each TB may be further divided into CBGs herein. Data of one CBG in one TB is the same as data of N CBGs in another TB. In other words, data of one CBG in one TB is a sum of data of N CBGs in another TB.

Figure 9:
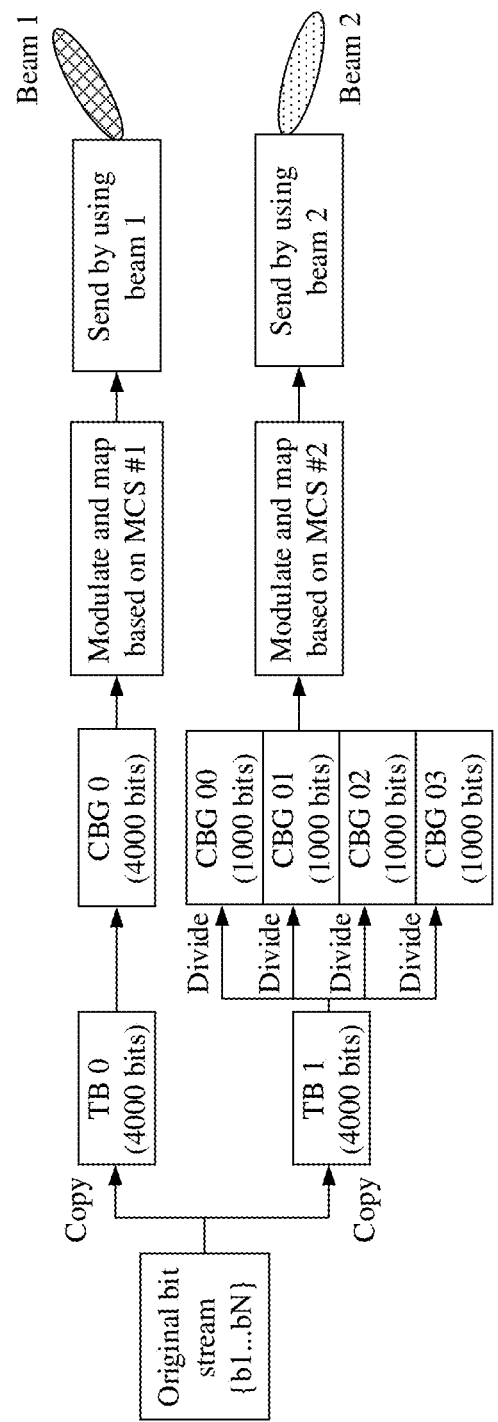
FIG. 9 is still another example in which a network device performs reliable transmission.

FIG. 9 is still another example in which a network device performs reliable transmission. As shown in FIG. 9, the network device copies an original data stream into two copies, and transmits the two copies by using a TB 0 and a TB 1, where the TB 0 and the TB 1 are respectively same 4000 bits. The 4000 bits of the TB 0 are used as one CBG (for example, a CBG 0 in FIG. 9), and are sent by using a beam 1. The 4000 bits of the TB 1 are divided into four CBGs (such as a CBG 00, a CBG 01, a CBG 02, and a CBG 03 in FIG. 9), and each CBG includes 1000 bits. All the four CBGs are transmitted by using a beam 2. In addition, the CBG 0 uses the MCS #1 for modulation, and the four CBGs of the TB 1 use the MCS #2 for modulation.

(7) Data of one CB in one TB is the same as data of N CBs in another TB.

In the foregoing possibilities, the first TB, CBG, CB, or CW may be transmitted by using one HARQ process, and another or N TBs, CBGs, CBs, or CWs may be transmitted by using N HARQ processes. Alternatively, another or N TBs, CBGs, CBs, or CWs may be transmitted by using K HARQ processes, where K may be greater than N or less than N, and K is an integer.

The foregoing describes in detail various manners in which the network device retransmits data to the terminal device according to the embodiments of this application. In the foregoing manners, the network device may indicate, to the UE by using any one or more of RRC, system information, a MAC-CE, and DCI, an association relationship between transmission units configured by the network device. The transmission unit may be a TB, a CB, a CBG, or a CW. There may be an association relationship between transmission units of a same type. For example, there may be an association relationship between TBs and TBs, and there may be an association relationship between CBs and CBs. Alternatively, there may be an association relationship between different types of transmission units. For example, there is an association relationship between one TB and one or more CBGs of another TB.

The foregoing describes in detail several transmission modes provided in this application. It may be understood that specific implementations of these manners may be combined randomly if no conflict occurs. For example, Manner 1 describes that a plurality of transmission units are transmitted by using a plurality of different HARQ processes, and the different transmission units carry same data. Data carried by different transmission units may also be partially the same (similar to Manner 4), or different transmission units may carry different redundancy versions of same data (similar to Manner 3), or the like.

Optionally, in this embodiment of this application, the network device may further send priority information to the terminal device, where the priority information is used to indicate priorities of the plurality of transmission units having an association relationship or indicate priorities of the plurality of HARQ processes having an association relationship.

Optionally, in an embodiment, that the terminal device successfully receives one of the plurality of transmission units or data of one of the plurality of HARQ processes includes:

the terminal device successfully receives data of N transmission units with highest priorities in the plurality of transmission units or data of N HARQ processes with highest priorities in the plurality of HARQ processes; and that the terminal device sends a positive acknowledgement to the network device includes:

the terminal device sends a positive acknowledgement to the network device in an HARQ process corresponding to each of the plurality of transmission units or in each of the plurality of HARQ processes, where N is an integer greater than or equal to 1.

In an implementation, if the network device has configured the priorities of the plurality of transmission units, the terminal device may receive, based on the priorities, the plurality of transmission units having an association relationship. If the terminal device successfully receives the N transmission units with highest priorities in the plurality of transmission units, the terminal device may send the positive acknowledgement to the network device in the HARQ process corresponding to each of the plurality of transmission units. Alternatively, if the network device has configured the priorities of the plurality of HARQ processes having an association relationship, the terminal device may send the positive acknowledgement to the network device in each of the plurality of HARQ processes.

In an implementation, when the transmission units have priorities, the terminal device may alternatively first decode one transmission unit with a highest priority, and feed back an ACK to the network device if the decoding succeeds. If the decoding fails, the transmission unit with a second highest priority is further decoded, and the rest may be deduced by analogy. Alternatively, the terminal device first decodes the N transmission units with highest priorities, and then decodes all transmission units having an association relationship when the decoding fails. A specific decoding process may be agreed upon by the network device and the terminal device, or performed by the terminal device under the indication of the network device. This is not limited in this application.

Optionally, in an embodiment, that the terminal device successfully receives one of the plurality of transmission units or data of one of the plurality of HARQ processes includes:

the terminal device successfully receives M transmission units with lowest priorities in the plurality of transmission units or data of M HARQ processes with lowest priorities in the plurality of HARQ processes; and that the terminal device sends a positive acknowledgement to the network device includes:

the terminal device sends a positive acknowledgement to the network device in an HARQ process corresponding to each of the M transmission units or in each of the M HARQ processes, where M is an integer greater than or equal to 1.

The method may further include: The terminal device sends a negative acknowledgement to the network device in an HARQ process corresponding to a transmission unit other than the M transmission units in the plurality of transmission units or in HARQ processes other than the M HARQ processes in the plurality of HARQ processes.

When the network device has configured the priorities of the plurality of transmission units having an association relationship, if the terminal device successfully receives M transmission units with lowest priorities in the plurality of transmission units, the terminal device may send a positive acknowledgement to the network device in an HARQ process corresponding to each of the M transmission units with lowest priorities. Further, the terminal device may further send a negative acknowledgement in an HARQ process corresponding to a transmission unit other than the M transmission units with lowest priorities, where M is an integer greater than or equal to 1.

The network device may also configure priorities of the plurality of HARQ processes having an association relationship. If the data of the M HARQ processes with lowest priorities in the plurality of HARQ processes is successfully received, the terminal device sends a positive acknowledgement to the network device in each of the M HARQ processes with lowest priorities. Further, the terminal device may send a negative acknowledgement in HARQ processes other than the M HARQ processes with lowest priorities in the plurality of HARQ processes having an association relationship.

Optionally, the priority information may be delivered together with the association relationship indication information, or delivered before or after the association relationship indication information is delivered.

Optionally, in an implementation, the network device does not specifically generate priority information, but carries priorities of the plurality of transmission units by using the association relationship indication information. The following provides an example for description.

(1) There is an association relationship between TBs in a network device configuration set {TB n, TB n+1, . . . , TB N}. The TB N represents an $N^{th}$ TB, n≥0 and is an integer, N≥1 and is an integer, n≠N, and n+1≠N. The priority sorting may be set by the network device. For example, the first TB in the set {TB n, TB n+1, . . . , TB N} has a highest priority, and priorities descend sequentially. Alternatively, the first TB in the set {TB n, TB n+1, . . . , TB N} has a lowest priority, and the priorities ascend sequentially.

(2) There is an association relationship between CBGs in a network device configuration set {CBG n, CBG n+1, . . . , CBG N}. The CBG N represents an $N^{th}$ CBG, n≥1 and is an integer, N≥1 and is an integer, n≠N, and n+1≠N.

(3) There is an association relationship between TBs and a CBG in a network device configuration set {TB 0, TB 1: CBG 0}.

The CBG 0 may be a CBG in the TB 1, and the TB 1 and the TB 0 are same or different TBs. For brevity of description, in this embodiment, the CBG 0 is used to represent the TB 1: CBG 0.

The priority configuration in (2) and (3) may be similar to that in (1). In addition, an association relationship may be configured between the TB and the CB, and priorities of the TB and the CB may be configured, or an association relationship may be configured between the CBG and the CB, and priorities of the CBG and the CB may be configured. All manners are similar, and are not listed one by one.

It should be noted that the foregoing method embodiments of this application may also be applied to an uplink transmission process. In other words, the terminal device sends data to the network device, and the network device sends ACK/NACK information to the terminal device.

The methods for sending and receiving feedback information provided in this application are described in detail above with reference to FIG. 1 to FIG. 9. The following describes an apparatus for sending feedback information and an apparatus for receiving feedback information provided in this application.

Figure 10:
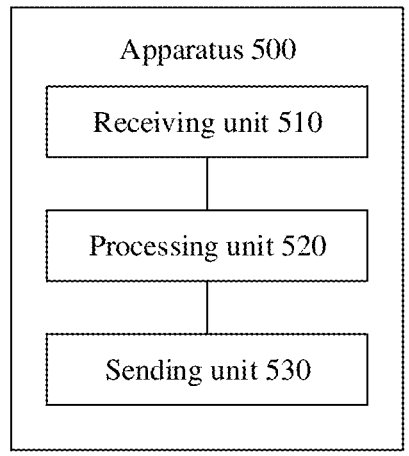
FIG. 10 is a schematic diagram of an apparatus for sending feedback information according to this application.

FIG. 10 is a schematic diagram of an apparatus 500 for sending feedback information according to this application. As shown in FIG. 10, the apparatus 500 includes a receiving unit 510, a processing unit 520, and a sending unit 530.

The receiving unit 510 is configured to receive association relationship indication information from a network device, where the association relationship indication information is used to indicate a plurality of transmission units or a plurality of HARQ processes having an association relationship, and the receiving unit 510 is further configured to receive, from the network device, data of the plurality of transmission units or the plurality of HARQ processes having an association relationship.

The processing unit 520 is configured to determine that the receiving unit 510 successfully receives one of the plurality of transmission units or data of one of the plurality of HARQ processes.

The sending unit 530 is configured to send a positive acknowledgement to the network device.

The apparatus 500 corresponds to the terminal device in the method embodiments, and corresponding units of the apparatus 500 are configured to perform corresponding operations performed by the terminal device in the methods 200 and the embodiments of the methods 200. For example, the receiving unit 510 in the apparatus 500 performs an operation of receiving in the method embodiments, for example, performs operation 210 of receiving the association relationship indication information from the network device in FIG. 2, or performs operation 220 of receiving, from the network device, the data of the plurality of transmission units or the plurality of HARQ processes having an association relationship. The sending unit 530 in the apparatus 500 is configured to perform an operation of sending in the methods 200 and the embodiments of the methods 200. For example, the sending unit 530 performs operation 230 of sending a positive acknowledgement to the network device in FIG. 2. The processing unit 520 performs an operation implemented or processed inside the terminal device in the methods 200 and the embodiments of the methods 200. For example, the processing unit 520 determines whether the receiving unit 510 successfully receives the one transmission unit or the data of the one HARQ process. Optionally, the receiving unit 510 and the sending unit 530 may form a transceiver unit that has both receiving and sending functions. The processing unit 520 may be a processor. The receiving unit 510 may be a receiver. The sending unit 530 may be a transmitter. The receiver and the transmitter may be integrated into a transceiver.

Figure 11:
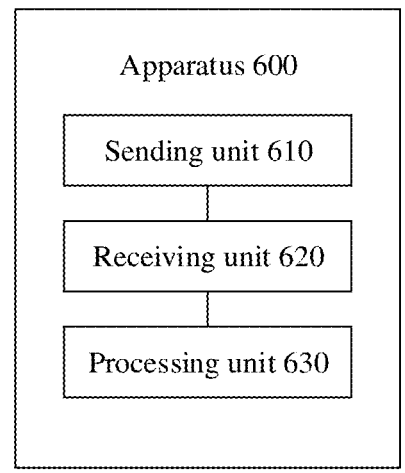
FIG. 11 is a schematic diagram of an apparatus for receiving feedback information according to this application.

FIG. 11 is a schematic diagram of an apparatus 600 for receiving feedback information according to this application. As shown in FIG. 11, the apparatus 600 includes a sending unit 610.

The sending unit 610 is configured to send association relationship indication information to a terminal device, where the association relationship indication information is used to indicate a plurality of transmission units or a plurality of HARQ processes having an association relationship, and the sending unit 610 is further configured to send data of the plurality of transmission units or the plurality of HARQ processes having an association relationship to the terminal device.

A receiving unit 620 is configured to: when one of the plurality of transmission units having an association relationship or data of one of the plurality of HARQ processes is successfully received by the terminal device, receive a positive acknowledgement sent by the terminal device.

Optionally, the apparatus 600 further includes a processing unit 630. The processing unit 630 is configured to generate the association relationship indication information.

The apparatus 600 corresponds to the network device in the method embodiments, and corresponding units of the apparatus 600 are configured to perform corresponding operations performed by the network device in the methods 200 and the embodiments of the methods 200. For example, the sending unit 610 in the apparatus 600 is configured to perform an operation of sending in the method embodiments. For example, the sending unit 610 performs operation 210 of sending the association relationship indication information to the terminal device in FIG. 2, or performs operation 220 of sending the data of the plurality of transmission units or the plurality of HARQ processes having an association relationship to the terminal device. For another example, the sending unit 610 further performs an operation of sending priority information and link performance indication information to the terminal device. The receiving unit 620 is configured to perform an operation of receiving in the method embodiments. For example, the receiving unit 620 performs operation 230 of receiving a positive acknowledgement from the terminal device in FIG. 2. Alternatively, the receiving unit 620 performs an operation of receiving a negative acknowledgement from the terminal device. Operations implemented inside the network device may be performed by the processing unit 630. For example, the processing unit 630 performs operation 240 of generating the association relationship indication information in FIG. 2, and the like. Optionally, the sending unit 610 and the receiving unit 620 may form a transceiver unit that has both receiving and sending functions. The processing unit 630 may be a processor. The sending unit 610 may be a transmitter. The receiving unit 620 may be a receiver. The receiver and the transmitter may be integrated into a transceiver.

Figure 12:
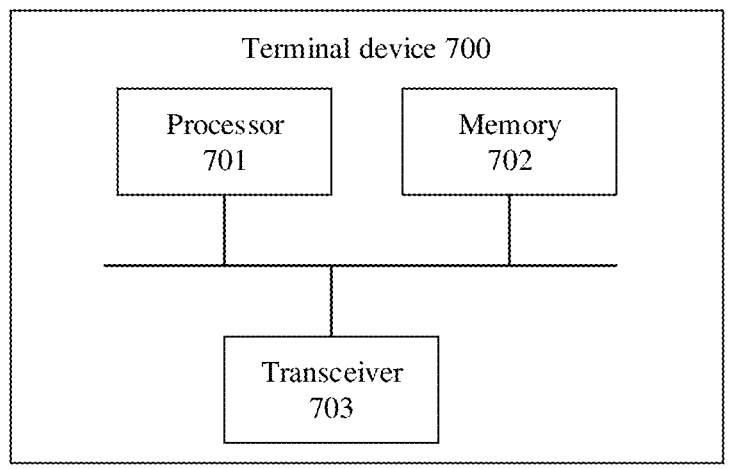
FIG. 12 is a schematic structural block diagram of a terminal device applicable to an embodiment of this application.

FIG. 12 is a schematic structural block diagram of a terminal device 700 applicable to an embodiment of this application. As shown in FIG. 12, the terminal device 700 includes: one or more processors 701, one or more memories 702, and one or more transceivers 703. The processor 701 is configured to control the transceiver 703 to send and receive a signal. The memory 702 is configured to store a computer program. The processor 701 is configured to invoke the computer program from the memory 702 and run the computer program, to perform the methods 200 for sending and receiving feedback information according to this application and corresponding procedures and/or operations performed by the terminal device in the embodiments.

Figure 13:
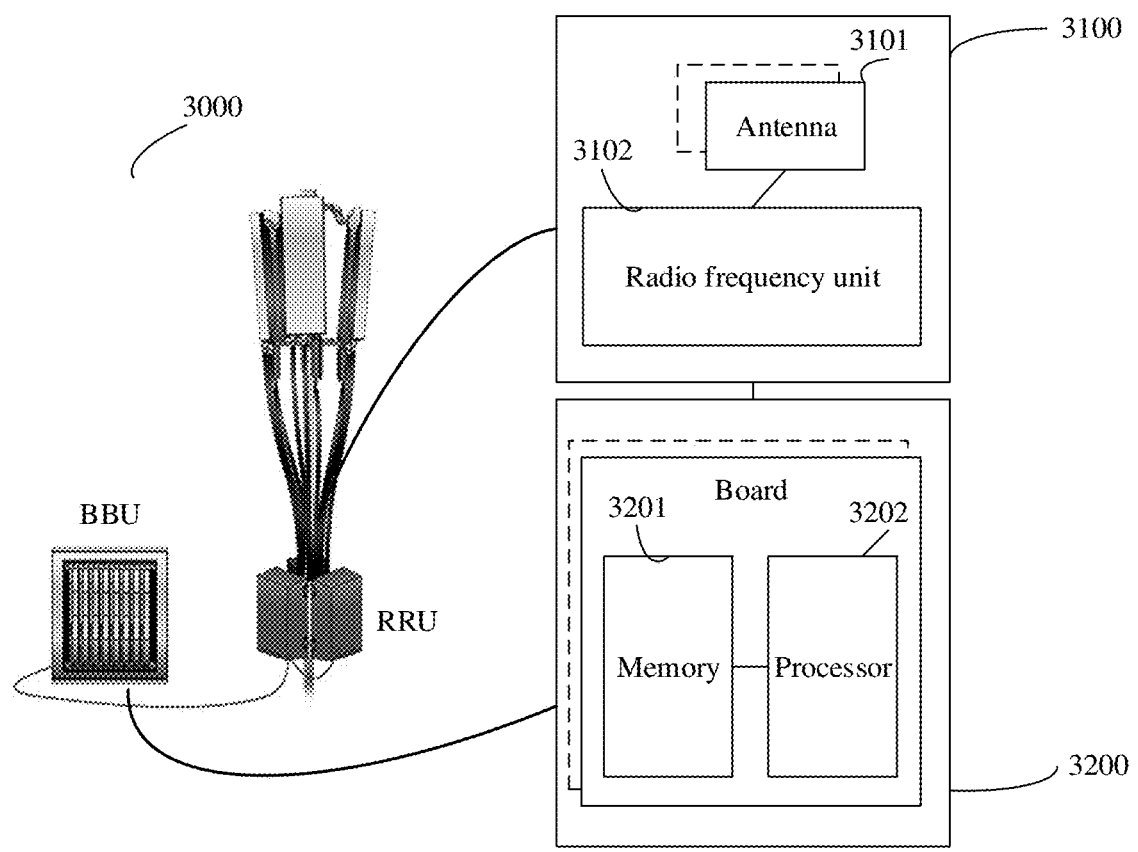
FIG. 13 is a schematic structural block diagram of a network device applicable to an embodiment of this application.

FIG. 13 is a schematic structural block diagram of a network device 3000 applicable to an embodiment of this application. As shown in FIG. 13, the network device 3000 may be used in the wireless communications system shown in FIG. 1, and perform functions of the network device in the method embodiments of this application. The network device 3000 may be, for example, a base station.

The network device 3000 may include one or more radio frequency units, such as a remote radio unit (RRU) 3100 and one or more baseband units (BBU). The baseband unit may also be referred to as a digital unit (DU) 3200. The RRU 3100 may be referred to as a transceiver unit, and corresponds to the sending unit 610 in FIG. 11. Optionally, the transceiver unit 3100 may also be referred to as a transceiver, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (referred to as a receiver or a receiver circuit), and the sending unit may correspond to a transmitter (referred to as a transmitter or a transmitter circuit). The RRU 3100 is mainly configured to: receive and send a radio frequency signal, and perform conversion between the radio frequency signal and a baseband signal. For example, the RRU 3100 is configured to send configuration information to a terminal device. The BBU 3200 is mainly configured to: perform baseband processing, control the base station, and the like. The RRU 3100 and the BBU 3200 may be physically disposed together, or may be physically separated, namely, a distributed base station.

The BBU 3200 is a control center of the network device 3000, or may be referred to as a processing unit. The BBU 3200 may correspond to the processing unit 620 in FIG. 11, and is mainly configured to implement a baseband processing function, for example, channel coding, multiplexing, modulation, and spreading. For example, the BBU (the processing unit) may be configured to control the base station to perform an operation procedure performed by the network device in the foregoing method embodiments, for example, generate the association relationship indication information.

In an example, the BBU 3200 may include one or more boards, and a plurality of boards may jointly support a radio access network (for example, an LTE network) having single access standard, or may separately support radio access networks (for example, an LTE network, a 5G network, or another network) having different access standards. The BBU 3200 further includes a memory 3201 and a processor 3202. The memory 3201 is configured to store a necessary instruction and necessary data. The processor 3202 is configured to control the network device 3000 to perform a necessary action. For example, the processor 3202 is configured to control the network device 3000 to perform an operation procedure performed by the network device in the foregoing method embodiments. The memory 3201 and the processor 3202 may serve the one or more boards. In other words, a memory and a processor may be separately disposed on each board. Alternatively, a plurality of boards may share a same memory and a same processor. In addition, a necessary circuit may be further disposed on each board.

It should be understood that the network device 3000 shown in FIG. 13 can implement functions of the network device in the method embodiments in FIG. 1 to FIG. 9. Operations and/or functions of units in the network device 3000 are intended to implement corresponding procedures performed by the network device in the method embodiments of this application. To avoid repetition, detailed descriptions are appropriately omitted herein.

The BBU 3200 may be configured to perform an action that is implemented inside the network device and that is described in the foregoing method embodiments, for example, generate the association relationship indication information. The RRU 3100 may be configured to perform an action of receiving or sending that is performed by the network device from or to the terminal device in the foregoing method embodiments. For example, the RRU 3100 sends the association relationship indication information to the terminal device, send the data of the plurality of transmission units or the plurality of HARQ processes having an association relationship, and the like. For details, refer to the descriptions in the foregoing method embodiments.

In addition, this application further provides a computer-readable storage medium. The computer-readable storage medium stores a computer instruction. When the computer instruction is run on a computer, the computer is enabled to perform the methods 200 for sending and receiving feedback information and corresponding operations and/or procedures performed by the terminal device in the embodiments of this application.

This application further provides a computer program product. The computer program product includes computer program code. When the computer program code is run on a computer, the computer is enabled to perform the methods 200 for sending and receiving feedback information and corresponding operations and/or procedures performed by the terminal device in the embodiments of this application.

This application further provides a chip, including a processor. The processor is configured to read and run a computer program stored in a memory, to perform the methods 200 for sending and receiving feedback information and corresponding operations and/or procedures performed by the terminal device in the embodiments of this application. Optionally, the chip further includes the memory. The memory is connected to the processor through a circuit or a cable. The processor is configured to read and execute the computer program in the memory. Further, optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

In addition, this application provides a computer-readable storage medium. The computer-readable storage medium stores a computer instruction. When the computer instruction is run on a computer, the computer is enabled to perform the methods 200 for sending and receiving feedback information and corresponding operations and/or procedures performed by the network device in the embodiments of this application.

This application further provides a computer program product. The computer program product includes computer program code. When the computer program code is run on a computer, the computer is enabled to perform the methods 200 for sending and receiving feedback information and corresponding operations and/or procedures performed by the network device in the embodiments of this application.

This application further provides a chip, including a processor. The processor is configured to invoke and run a computer program stored in a memory, to perform the methods 200 for sending and receiving feedback information and corresponding operations and/or procedures performed by the network device in the embodiments of this application. Optionally, the chip further includes the memory. The memory is connected to the processor through a circuit or a cable. The processor is configured to read and execute the computer program in the memory. Further, optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

In the foregoing embodiments, the processor may be a central processing unit (CPU), a microprocessor, an application-specific integrated circuit (ASIC), one or more integrated circuits for controlling program execution in the technical solutions of this application, or the like. For example, the processor may be a digital signal processor device, a microprocessor device, an analog-to-digital converter, a digital-to-analog converter, or the like. The processor may allocate control and signal processing functions of the terminal device or the network device between these devices based on respective functions of the devices. In addition, the processor may include a function for operating one or more software programs, and the software programs may be stored in a memory. The function of the processor may be implemented by hardware or may be implemented by hardware executing corresponding software. The hardware or the software includes one or more modules corresponding to the foregoing function.

The memory may be a read-only memory (ROM), another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, any other medium that can be used to carry or store expected program code in a form of an instruction or a data structure and that can be accessed by a computer, or the like.

Optionally, the memory and the processor in the foregoing embodiments may be physically independent units, or the memory and the processor may be integrated together.

In the embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be in a singular or plural form. The character "/" usually indicates an "or" relationship between the associated objects. "At least one of the following" or a similar expression thereof means any combination of these items, including a singular item or any combination of a plurality of items. For example, at least one of a, b, or c may indicate: a, b, c, a and b, a and c, b and c, or a, b, and c, where a, b, and c may be in a singular or plural form.

A person of ordinary skill in the art may be aware that the units and algorithm operations described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatuses, and units, refer to a corresponding process in the foregoing method embodiments.

In the several embodiments provided in this application, the disclosed system, apparatuses, and methods may be implemented in another manner. For example, the described apparatus embodiments are merely examples. For example, division into the units is merely a logical function division and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may not be physically separate, and parts displayed as units may not be physical units, that is, may be located in one position, or may be distributed on a plurality of network units. Some or all of the units may be selected based on actual requirements to achieve the objectives of the technical solutions of this application.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium and includes several instructions for instructing a computer device (which may be a personal computer, a server, or a network device, or the like) to perform all or some of the operations of the methods described in the embodiments of this application. The foregoing storage medium includes any medium that can store program code, such as a USB flash drive, a removable hard disk, ROM, RAM, a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for receiving feedback information, comprising sending, by a network device to a terminal device, association relationship indication information of an associating relationship, wherein the association relationship indication information indicates a plurality of transmission units having the association relationship or a plurality of hybrid automatic repeat request (HARQ) processes having the association relationship;

sending, by the network device, data of the plurality of transmission units or the plurality of HARQ processes to the terminal device, wherein each transmission unit of the plurality of transmission units or the plurality of HARQ processes carries same data, carries different redundancy versions of same data, or carries a same part of data;

receiving, by the network device, a positive acknowledgement sent by the terminal device, wherein the positive acknowledgement indicates that one of the plurality of transmission units or data of one of the plurality of HARQ processes is successfully received by the terminal device, irrespective of whether any others of the plurality of transmission units or data of one of the plurality of HARQ processes are successfully received by the terminal device; and in response to said receiving the positive acknowledgement sent by the terminal device, releasing, by the network device, all HARQ processes associated with said data of the plurality of transmission units or the plurality of HARQ processes.

2. The method according to claim 1, wherein the method further comprises:

sending, by the network device, transmission mode indication information to the terminal device, wherein the transmission mode indication information indicates a transmission mode used by the network device to transmit the plurality of transmission units having the association relationship, and the transmission mode comprises one of:

the plurality of transmission units are transmitted by using a plurality of different HARQ processes, and different transmission units carry same data;

the plurality of transmission units are transmitted by using a plurality of different HARQ processes, and different transmission units carry different redundancy versions of same data;

the plurality of transmission units are transmitted by using one HARQ process, and different transmission units carry same data; or the plurality of transmission units are transmitted by using a plurality of different HARQ processes, and different transmission units carry a same part of data.

3. A terminal device, comprising:

a receiver, configured to receive association relationship indication information for an association relationship from a network device, wherein the association relationship indication information indicates a plurality of transmission units having the association relationship or a plurality of hybrid automatic repeat request (HARQ) processes having the association relationship, wherein the receiver is further configured to receive, from the network device and in accordance with the association relationship indication information, data of the plurality of transmission units or the plurality of HARQ processes, wherein each transmission unit of the plurality of transmission units or the plurality of HARQ processes carries same data, carries different redundancy versions of same data, or carries a same part of data;

a processor, configured to determine that the receiver successfully receives one of the plurality of transmission units or data of one of the plurality of HARQ processes; and a transmitter, configured to send a positive acknowledgement to the network device in response to a determination that the receiver successfully receives one of the plurality of transmission units or data of one of the plurality of HARQ processes irrespective of whether any others of the plurality of transmission units or data of one of the plurality of HARQ processes are successfully received by the receiver.

4. The terminal device according to claim 3, wherein the receiver is further configured to:

receive transmission mode indication information from the network device, wherein the transmission mode indication information indicates a transmission mode used by the network device to transmit the plurality of transmission units having an association relationship, and the transmission mode comprises one of:

the plurality of transmission units are transmitted by using a plurality of different HARQ processes, and different transmission units carry same data;

the plurality of transmission units are transmitted by using a plurality of different HARQ processes, and different transmission units carry different redundancy versions of same data; r the plurality of transmission units are transmitted by using one HARQ process, and different transmission units carry same data; or the plurality of transmission units are transmitted by using a plurality of different HARQ processes, and the different transmission units carry a same part of data.

5. The terminal device according to claim 4, wherein the plurality of transmission units are configured to be transmitted by using the plurality of different HARQ processes, and the plurality of different HARQ processes are transmitted by using different beams and/or transmission reception points (TRPs); or the plurality of transmission units are configured to be transmitted by using one HARQ process, and the HARQ process is transmitted by using different beams and/or different TRPs.

6. The terminal device according to claim 3, wherein the transmission units comprise a transport block (TB), a code block (CB), a code block group (CBG), or a codeword (CW).

7. The terminal device according to claim 3, wherein the plurality of transmission units are sent by using different frequency domain locations.

8. The terminal device according to claim 3, wherein the receiver is further configured to receive priority information from the network device, wherein the priority information indicates priorities of the plurality of transmission units having an association relationship or priorities of the plurality of HARQ processes having an association relationship;

the receiver is configured to successfully receive N transmission units with highest priorities in the plurality of transmission units or data of N HARQ processes with highest priorities in the plurality of HARQ processes; and the transmitter is configured to send, in an HARQ process corresponding to each of the plurality of transmission units or in each of the plurality of HARQ processes, the positive acknowledgement to the network device, wherein N is an integer greater than or equal to 1; or the receiver is configured to successfully receive M transmission units with lowest priorities in the plurality of transmission units or data of M HARQ processes with lowest priorities in the plurality of HARQ processes; and the transmitter is configured to send, in an HARQ process corresponding to each of the M transmission units or in each of the M HARQ processes, the positive acknowledgement to the network device, wherein M is an integer greater than or equal to 1; and the transmitter is further configured to send, in HARQ processes corresponding to transmission units other than the M transmission units in the plurality of transmission units or in HARQ processes other than the M HARQ processes in the plurality of HARQ processes, a negative acknowledgement to the network device.

9. The terminal device according to claim 3, wherein the transmitter is configured to send, in an HARQ process corresponding to at least one of the plurality of transmission units, the positive acknowledgement, wherein the at least one transmission unit comprises any one of the plurality of transmission units, or the at least one transmission unit comprises at least one of transmission units that are in the plurality of transmission units and that are successfully received by the terminal device; or the transmitter is configured to send, in at least one of the plurality of HARQ processes, the positive acknowledgement, wherein the at least one HARQ process comprises any one of the plurality of HARQ processes, or the at least one HARQ process comprises at least one of HARQ processes that are in the plurality of HARQ processes and that are successfully received by the terminal device.

10. The terminal device according to claim 9, wherein the transmitter is configured to send, in an HARQ process corresponding to at least one of transmission units that are in the plurality of transmission units and that are not successfully received by the terminal device, a positive acknowledgement and first link performance indication information to the network device, wherein the first link performance indication information indicates link quality of the HARQ process corresponding to the at least one of the transmission units that are not successfully received by the terminal device, or the transmitter is configured to send, in at least one of HARQ processes that are in the plurality of HARQ processes and that are not successfully received by the terminal device, a positive acknowledgement and second link performance indication information to the network device, wherein the second link performance indication information is used to indicate link quality of the at least one of the HARQ processes that are not successfully received by the terminal device.

11. The terminal device according to claim 9, wherein the transmitter is further configured to send a negative acknowledgement in an HARQ process corresponding to at least one of transmission units that are in the plurality of transmission units and that are not successfully received by the terminal device; or the transmitter is further configured to send a negative acknowledgement in at least one of HARQ processes that are in the plurality of HARQ processes and that are not successfully received by the terminal device.

12. A network device, comprising:
a transmitter, configured to send, to a terminal device, association relationship indication information for an association relationship, wherein the association relationship indication information indicates a plurality of transmission units having the association relationship or a plurality of hybrid automatic repeat request (HARQ) processes having the association relationship, wherein
the transmitter is further configured to send data of the plurality of transmission units or the plurality of HARQ processes to the terminal device, wherein each transmission unit of the plurality of transmission units or the plurality of HARQ processes carries same data, carries different redundancy versions of same data, or carries a same part of data; and
a receiver, configured to, when one of the plurality of transmission units or data of one of the plurality of HARQ processes is successfully received by the terminal device, receive a positive acknowledgement sent by the terminal device, wherein the positive acknowledgement indicates that one of the plurality of transmission units or data of one of the plurality of HARQ processes is successfully received by the terminal device, irrespective of whether any others of the plurality of transmission units or data of one of the plurality of HARQ processes are successfully received by the terminal device; and
in response to said receiving the positive acknowledgement sent by the terminal device, releasing, by the network device, all HARQ processes associated with said data of the plurality of transmission units or the plurality of HARQ processes.

13. The network device according to claim 12, wherein the transmitter is further configured to send transmission mode indication information to the terminal device, wherein the transmission mode indication information indicates a transmission mode used by the network device to transmit the plurality of transmission units having an association relationship, and the transmission mode comprises one of:
the plurality of transmission units are transmitted by using a plurality of different HARQ processes, and different transmission units carry same data;
the plurality of transmission units are transmitted by using a plurality of different HARQ processes, and different transmission units carry different redundancy versions of same data;
the plurality of transmission units are transmitted by using one HARQ process, and different transmission units carry same data; or
the plurality of transmission units are transmitted by using a plurality of different HARQ processes, and different transmission units carry a same part of data.

14. The network device according to claim 13, wherein the plurality of transmission units are transmitted by using the plurality of different HARQ processes, and the plurality of different HARQ processes are transmitted by using different beams and/or transmission reception points (TRPs); or
the plurality of transmission units are transmitted by using the HARQ process, and the HARQ process is transmitted by using different beams and/or different TRPs.

15. The network device according to claim 12, wherein the transmission units comprise a transport block (TB), a code block (CB), a code block group (CBG), or a codeword (CW).

16. The network device according to claim 12, wherein the plurality of transmission units are sent by using different frequency domain locations.

17. The network device according to claim 12, wherein the transmitter is further configured to send priority information to the terminal device, wherein the priority information indicates priorities of the plurality of transmission units having an association relationship or priorities of the plurality of HARQ processes having an association relationship, wherein
when the terminal device successfully receives N transmission units with highest priorities in the plurality of transmission units or data of N HARQ processes with highest priorities in the plurality of HARQ processes, the receiver is configured to receive, in an HARQ process corresponding to each of the plurality of transmission units or in each of the plurality of HARQ processes, the positive acknowledgement sent by the terminal device, wherein N is an integer greater than or equal to 1; or
when the terminal device successfully receives M transmission units with lowest priorities in the plurality of transmission units or data of M HARQ processes with lowest priorities in the plurality of HARQ processes, the receiver is configured to receive, in an HARQ process corresponding to each of the M transmission units or in each of the M HARQ processes, the positive acknowledgement sent by the terminal device, wherein M is an integer greater than or equal to 1; and the receiver is further configured to receive, in HARQ processes corresponding to transmission units other than the M transmission units in the plurality of transmission units or in HARQ processes other than the M HARQ processes in the plurality of HARQ processes, a negative acknowledgement sent by the terminal device.

18. The network device according to claim 12, wherein the receiver is further configured to:
receive, in an HARQ process corresponding to at least one of the plurality of transmission units, the positive acknowledgement sent by the terminal device, wherein the at least one transmission unit comprises any one of the plurality of transmission units, or the at least one transmission unit comprises at least one of transmission units that are in the plurality of transmission units and that are successfully received by the terminal device; or
receive, in at least one of the plurality of HARQ processes, the positive acknowledgement, wherein the at least one HARQ process comprises any one of the plurality of HARQ processes, or the at least one HARQ process comprises at least one of HARQ processes that are in the plurality of HARQ processes and that are successfully received by the terminal device.

19. The network device according to claim 18, wherein the receiver is further configured to:
   receive, in an HARQ process corresponding to at least one of transmission units that are in the plurality of transmission units and that are not successfully received by the terminal device, a positive acknowledgement and first link performance indication information that are sent by the terminal device, wherein the first link performance indication information is used to indicate link quality of the HARQ process corresponding to the at least one of the transmission units that are not successfully received by the terminal device, or
   receive, in at least one of HARQ processes that are in the plurality of HARQ processes and that are not successfully received by the terminal device, a positive acknowledgement and second link performance indication information that are sent by the terminal device, wherein the second link performance indication information is used to indicate link quality of the at least one of the HARQ processes that are not successfully received by the terminal device.

20. The network device according to claim 18, wherein the receiver is further configured to:
   receive, in an HARQ process corresponding to at least one of transmission units that are in the plurality of transmission units and that are not successfully received by the terminal device, a negative acknowledgement sent by the terminal device; or
   receive, in at least one of HARQ processes that are in the plurality of HARQ processes and that are not successfully received by the terminal device, a negative acknowledgement sent by the terminal device.

* * * * *